United States Patent

Rogina et al.

[11] Patent Number: 5,703,961
[45] Date of Patent: Dec. 30, 1997

[54] IMAGE TRANSFORMATION AND SYNTHESIS METHODS

[75] Inventors: Peter R. Rogina, Martinsville, N.J.; David Macintosh, Inverkeithing, United Kingdom

[73] Assignee: WorldScape L.L.C., Martinsville, N.J.

[21] Appl. No.: 365,750

[22] Filed: Dec. 29, 1994

[51] Int. Cl.⁶ .................................................. G06K 9/00
[52] U.S. Cl. ............................................ 382/154; 382/276
[58] Field of Search .................................. 382/154, 236, 382/238, 251, 252, 284, 293, 318, 294, 103, 106, 107, 153, 260, 266, 276, 277, 285, 286, 291, 295, 296, 298, 300; 348/584, 580, 159, 36, 39, 38, 147, 123, 169, 124; 395/127, 118, 119, 114; 434/43, 38; 345/89, 138

[56] References Cited

U.S. PATENT DOCUMENTS

| | | | |
|---|---|---|---|
| 3,560,644 | 2/1971 | Petrocelli et al. | 348/36 |
| 4,062,045 | 12/1977 | Iwane | 358/88 |
| 4,103,435 | 8/1978 | Herndon | 348/36 |
| 4,541,007 | 9/1985 | Nagata | 358/3 |
| 4,571,616 | 2/1986 | Haisma et al. | 358/88 |
| 4,757,378 | 7/1988 | Hackett, Jr. et al. | 358/88 |
| 4,772,942 | 9/1988 | Tuck | 348/38 |
| 4,858,149 | 8/1989 | Quarendon | 348/580 |
| 4,879,596 | 11/1989 | Miura et al. | 358/88 |
| 4,879,597 | 11/1989 | Barton et al. | 358/88 |
| 4,881,122 | 11/1989 | Murakami | 358/88 |
| 4,928,175 | 5/1990 | Haggren | 348/159 |
| 4,931,817 | 6/1990 | Morioka | 354/113 |
| 4,943,854 | 7/1990 | Shiota et al. | 348/159 |
| 4,943,864 | 7/1990 | Elberbaum | 348/159 |
| 4,952,024 | 8/1990 | Gale | 350/143 |
| 4,957,351 | 9/1990 | Shioji | 350/348 |
| 5,015,188 | 5/1991 | Pellosie, Jr. et al. | 395/119 |
| 5,015,189 | 5/1991 | Wenzinger, Jr. | 348/36 |
| 5,023,725 | 6/1991 | McCutchen | 358/231 |
| 5,049,987 | 9/1991 | Hoppenstein | 358/88 |
| 5,084,763 | 1/1992 | Naradate et al. | 358/88 |
| 5,101,269 | 3/1992 | Shelley et al. | 358/88 |
| 5,130,794 | 7/1992 | Ritchey | 358/87 |
| 5,148,310 | 9/1992 | Batchko | 359/479 |
| 5,172,266 | 12/1992 | Garcia et al. | 359/478 |
| 5,187,571 | 2/1993 | Braun et al. | 348/39 |
| 5,311,305 | 5/1994 | Mahadevan et al. | 348/169 |

FOREIGN PATENT DOCUMENTS

61-125686  6/1986  Japan .............................. G06K 9/00

OTHER PUBLICATIONS

Ritchey, Kurtis J., *Image Based Panoramic Virtual Reality System*, Simulated Environments, p. 167 No Date. No Place of Publication.

Quinio, Philippe, *A Random Set Approach to 3D Scene Reconstruction by Stereoscopic Vision*, Stereoscopic Displays and Applications III, p. 173. No Date or Publisher.

(List continued on next page.)

*Primary Examiner*—Leo Boudreau
*Assistant Examiner*—Bijan Tadayon
*Attorney, Agent, or Firm*—Lerner, David, Littenberg, Krumholz & Mentlik

[57] ABSTRACT

A system for generating images of a scene as the scene would be observed from an arbitrary location. A plurality of discrete images, typically video images, taken at different viewpoints, as, for example, by a plurality of cameras pointing outwardly on a curving locus are converted to an offset epipolar image. The offset epipolar image includes a plurality of linesets, each such lineset incorporating one scanning line from each of the discrete video images. Each line in the virtual image is reconstructed from a lineset of the epipolar image. The reconstruction may include interpolation between pixel data representing lines from adjacent discrete images and mapping of pixels from one or more lines representing one or more adjacent discrete images onto the pixel line of the virtual image. The nature of the mapping depends upon the viewpoint selected for the virtual image. The system can provide real time stereoscopic telepresence, i.e., a virtual viewpoint images for each eye as the observer moves his or her head.

50 Claims, 19 Drawing Sheets

OTHER PUBLICATIONS

Takahashi, et al., *Generation of Intermediate Parallax-Images for Holographic Stereograms*, Proc. SPIE vol. 1914 Practical Holography VII (1993). No Page Number.

Johnson, R. Colin, *Stairway to Reality*, OEM Magazine, Sep. 1994—No Page Number.

Fake Space Labs, *Binocular Omni-Orientation Monitor (Boom)* No Page Number or Date or Place or Author.

Fake Space Labs, *Molly—A Teleoperated Camera Platform* No Page Number or Date or Place or Author.

Popular Science, *Electronic Panning*, Sep. 1992 No Page Number or Author.

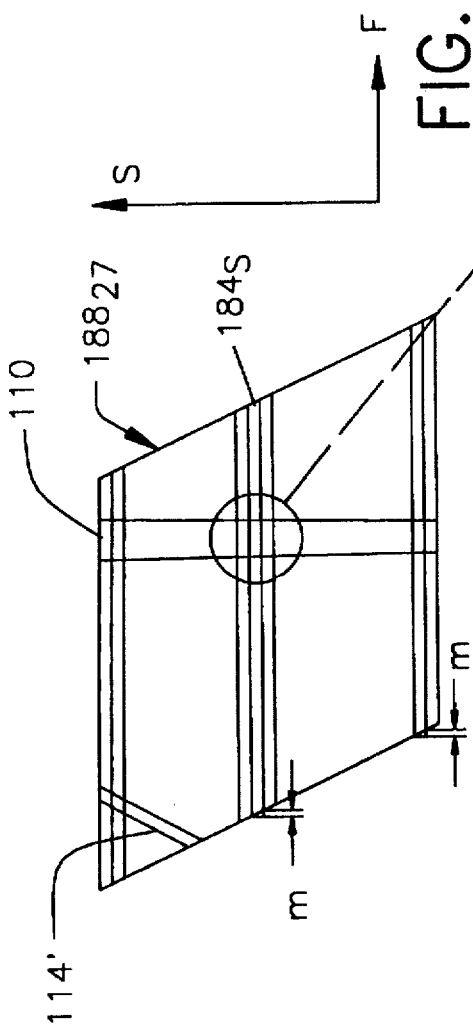
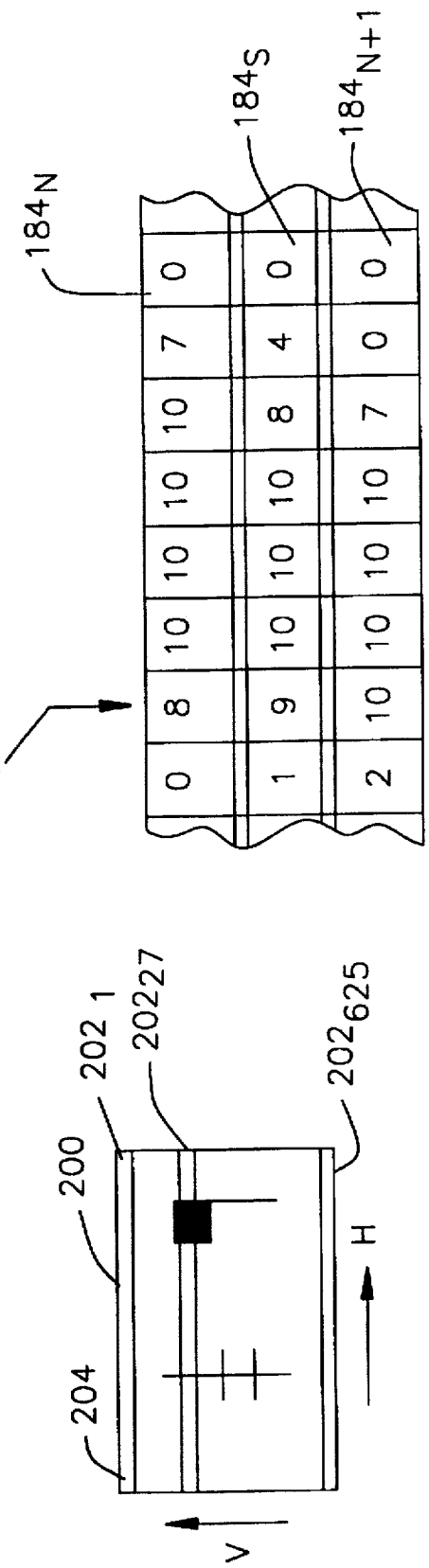
FIG. 6
FIG. 8
FIG. 9

IMAGE TRANSFORMATION AND SYNTHESIS METHODS

BACKGROUND OF THE INVENTION

The present invention relates to methods of apparatus for processing pictorial information to synthesize images from arbitrary viewpoints.

Ordinary image display systems such as a common television set or a computer screen with standard image display software provide monocular images from a viewpoint which is independent of the viewer's actual position. When the viewer turns his or her head, the displayed image does not change. Rather, the image continually reflects the viewpoint of the camera which originally generated the video signal or an artificial viewpoint in the image display software. Common systems for displaying stereoscopic images suffer from the same problem. For example, some common stereoscopic vision systems display a separate video image to each eye of the viewer, each such image corresponding to a slightly different camera position or slightly different artificial viewpoint in the case of computer generated images. Here again, however, the viewpoints do not change as the observer moves. Such systems therefore do not provide a truly realistic viewing experience.

Holographic images inherently provide a more realistic viewing experience. A viewer looking at a hologram sees the depicted object from a new viewpoint if he or she moves his or her head to a new location, or turns it to a new viewing angle. In this respect, the experience of looking at a hologram resembles the experience of looking at the depicted objects in reality. However, it is generally impractical to display holographic images of changing scenes. Although some holographic video systems have been demonstrated, they are extremely expensive, require very large bandwidth and suffer from other drawbacks.

So-called "virtual reality" systems can provide viewpoints which move as the observer moves his or her head. Some of these systems display computer generated images synthesized from mathematical models of the scene to be depicted. Such an image involves computation of the projection of the mathematically modelled elements of the scene onto an arbitrary view plane. To provide a stereoscopic view, two different viewing planes are used, corresponding to the slightly different viewing planes of the observers two eyes. Such systems can be provided with detectors for monitoring the actual orientation of the viewer and can be arranged to change the view planes used in the reconstruction as the orientation of the viewer changes. Such an arrangement theoretically can provide an illusion of presence in the scene. However, such systems are limited only to displaying images of mathematically generated scenes. Accordingly, they can only display images of synthetic, computer-created scenes or of real scenes which can be captured and modelled as mathematically tracktable elements suitable for handling by computer graphics software. They cannot normally display images of an arbitrary scene. Moreover, such systems require substantial computational power to perform all of the complex mathematical manipulations required. This problem is aggravated where the scene includes moving elements.

An alternative arrangement has been to use an actual camera or cameras directed at the real scene. For a stereoscopic view, two cameras are employed, spaced apart from one another by distance corresponding to the viewer's interpupillary distance. The cameras are mounted on a platform which in turn is linked to a servomechanism. The servomechanism is controlled by a sensor linked to the user's head. As the user moves his or her head, the camera platform duplicates such movement. Accordingly, the images captured by the cameras and transmitted to the user's eyes realistically duplicate the images which the user would see as he or she looks at the scene from any viewpoint. The system can provide a realistic experience of telepresence. The viewer sees essentially the same images as he or she would see if he were at the scene, and these images change in a realistic manner as the viewer's head moves. These systems are expensive, in that a set of cameras and the associated servo mechanisms must be provided for each user. Moreover, these systems require that the scene be in existence and available for viewing at the time the viewer wants to see the scene. They cannot operate with recorded images of the scene. Moreover, there must be continuous, two-way communication between the viewer's location and the real location of the scene, where the cameras are positioned. At least the communications channel from the scene location to the viewer's location must be a high-bandwidth video channel. All of these drawbacks together limit application of such servomechanism based systems to rare situations.

As described in an article by Takahashi et al, Generation Of Intermediate Parallax-images For Holographic Stereograms, Proceedings SPIE, Volume 1914, Practical Holography VII (1993) a so-called "Holographic Stereogram" can be synthesized from numerous individual monocular images of a scene, typically about 50 to 100 such images. To alleviate the need for actually capturing so many real images, the authors propose to generate intermediate images by projection back from three dimensional data defining the scene. The three dimensional data, in turn, is calculated from the images taken by real cameras at various locations on a linear camera locus. In this manner, the system is able to create intermediate images simulating the image which would be taken by a camera positioned between positions of real cameras. This system depends upon two-dimensional projection from three-dimensional data; i.e., calculation of the image which would appear in a viewing plane based upon data defining the location of objects in the scene in three dimensions. The system must determine the depth from the real cameras of each point in the scene.

To facilitate this determination, the authors propose to use certain characteristics of a so-called "epipolar image". As further described below, an epipolar image combines data from multiple cameras into partial images, each including part of the data from each camera. With conventional raster-scan video cameras, each portion of the epipolar image typically includes one scanning line from each camera of the multiple camera set. In such epipolar images, features appear as sloping strips or bands. The width and slope of the bands are related to the depth or distance between the actual feature and the camera locus. Moreover, it is possible to determine from the epipolar image which features in the scene occlude other features, i.e., which features lie to the front, closer to the cameras and in which features lie to the back. The authors thus propose to recover the depth of the various points in the image by using the epipolar image. That depth information, in turn, is used as part of three-dimensional data, which in turn is used to project a two-dimensional image simulating the two-dimensional image which would be captured by a camera at an intermediate location. This system nonetheless involves all of the computational complexity required to reconstruct two-dimensional images from three-dimensional images.

Moreover, Takahashi et al characterize their system only as suitable for generation of the sterographic holograms, and not for generation of images to be viewed directly by a viewer.

Accordingly, despite all of this effort in the art, there still remains a substantial, unmet need for improved methods of synthesizing and displaying an image of a scene from an arbitrary, synthesized viewpoint. In particular, there are substantial, unmet needs for improved methods of providing telepresence, including display of images from different viewpoints as the users head moves in real time. In particular, there are needs for a telepresence system which can provide images to multiple users simultaneously.

SUMMARY OF THE INVENTION

The present invention addresses these needs.

One aspect of the present invention includes a method of providing an image from an arbitrary virtual viewpoint. Methods according to this aspect of this invention include the steps of providing a plurality of discrete two-dimensional images corresponding to the image of a scene observed from a plurality of discrete viewpoints on a predetermined viewpoint locus. The methods further include the step of transforming the plural discrete images into a set of two-dimensional transform images, each including some information from a plurality of the discrete images. In each discrete image, all of the information is taken from a single viewpoint. Thus, each discrete image has a first dimension corresponding to a first real dimension of the actual scene (such as the horizontal dimension) and a second real dimension corresponding to the second real dimension of the scene (such as the vertical dimension). Each transform image includes some information from plural discrete images, and desirably from all of the discrete images each representing a different viewpoint. In each transform image, one dimension desirably, corresponds to a real dimension of the scene, whereas the second dimension desirably corresponds to viewpoint. That is, information from different discrete images at different viewpoints is disposed at different locations in the second dimension of the transform image. Stated another way, information from selected parts of each discrete image is mapped to selected portions of each transform image according to a preselected mapping scene. For example, where the discrete images include rows of pixels extending in a first image direction, these rows being disposed one atop another in a second image direction, the transform images may be epipolar images, each including a plurality of line sets. Each line set may incorporate one scanning line from each discrete image. All of the scanning lines in each line set are taken from the same location in the second dimension of their respective discrete images. The lines from the various discrete images are disposed side-by-side in the second or viewpoint dimension of the epipolar image in an order corresponding-to th e viewpoints of the discrete images from which such lines were taken. Thus, within each line set of the epipolar image, the first dimension corresponds to the first real dimension of the scene and the Second dimension corresponds to viewpoint location.

The method further includes the step of selecting at least one virtual viewpoint, typically including a virtual viewpoint location and a virtual viewpoint direction. Once a virtual viewpoint has been selected, a two dimensional virtual viewpoint image, corresponding to the image which would be observed looking from the virtual view location in the virtual view direction is synthesized. This synthesis is accomplished by selecting information from a plurality of the two-dimensional transform images according to a selection scheme which varies with the selected virtual viewpoint, i.e., with virtual view location, virtual view direction or both and combining the so-selected information, as by mapping the selected information to the new image. Preferably, this mapping is performed directly from each transform image to a part of the virtual viewpoint image. As further discussed below, the selection desirably includes the step of selecting a base viewpoint on the discrete viewpoint locus, i.e., selecting a base viewpoint from among the discrete viewpoints of the discrete images or a viewpoint interpolated between discrete images. Desirably, the selected base viewpoint is a viewpoint close to the virtual viewpoint. The base viewpoint may be used in mapping from transform images into the virtual viewpoint image.

Where the transform images include an epipolar image, having plural line sets as discussed above, the step of synthesizing the virtual viewpoint image may be performed by forming each line of the virtual viewpoint image independently, one such line being formed from each line set of the epipolar image. Formation of each line may include the steps of selecting or forming a base line within the line set corresponding to the base viewpoint, selecting pixel data in the base line, transforming this pixel data so that the transformed data represent pixel data taken from the virtual viewpoint. For example, the pixel data may be transform by compressing them in the dimension along the line to compensate for a different view direction. The selected transformed pixel data from the base line is incorporated into the line of the virtual viewpoint image. Ordinarily, the pixel data selected from the base line does not include all of the information necessary to fill out the line of the virtual viewpoint image. Thus, the step of forming each virtual viewpoint image line further includes the step of selecting supplementary pixels from one or more additional lines of the same line set. These supplementary pixels are adjacent to one or both ends of the base line. Data from the supplementary pixels is incorporated at one or both ends of the virtual viewpoint image line. All of the lines of the virtual viewpoint image may be formed in the same way so as to provide a full image corresponding to the image which would be seen from the selected virtual viewpoint.

These steps can be used in providing telepresence. In a telepresence system, the step of selecting a virtual viewpoint includes the step of detecting the disposition of an observer as the observer moves and selecting the virtual viewpoint so as to correspond to the viewpoint of the observer. Also, in a telepresence system, the method further includes the step of displaying the virtual viewpoint image to the observer substantially in a real time. That is, the steps of detecting the disposition of the observer, synthesizing a virtual viewpoint image and displaying that image are performed substantially in real time, as the observer moves, so that the observer sees the correct virtual viewpoint image for a new observer disposition as substantially immediately as the observer moves to the new disposition. For stereoscopic images, two virtual viewpoint images are generated for each observer disposition, these images being taken from slightly different virtual viewpoints corresponding to the dispositions of the observer's eyes.

In methods according to the foregoing aspects of the invention, each virtual viewpoint image is derived from two-dimensional images. There is no need to reconstruct the full or there-dimensional scene, or to calculate a projection from full three-dimensional scene-specifying data onto a two-dimensional image plane. Indeed, as further discussed below, the manipulation of pixel data required to construct the virtual viewpoint image preferably include only simple mapping of pixel data and lines of pixel data with some linear combinations or interpolations of pixel data. These steps can be carried out rapidly even where the images to be handled include large amounts of data as encountered in common video images. The system does not require any mathematical modelling or knowledge of the elements in the scene to be depicted. The discrete images can be any images of a scene, whether computer-generated or taken by a real cameras or some combination of the two. The discrete images need not be captured in real time during viewing. The discrete images or, the transform images, may be prerecorded. Further, the discrete images need not be static. Thus, the discrete images may be provided as sets, each such set incorporating discrete images captured at a given instant as, for example, frames or fields captured simultaneously by a plurality of video cameras. New transform images may be created for each such set. Here again, the step of creating the transform images from the discrete images need not include any complex, three-dimensional projection, but may instead may include simple concatenation of pixel data. Thus, methods according to this aspect of the present invention can be applied to provide telepresence in a dynamic environment, i.e., the illusion that-the observer is actually present in a scene including moving objects. The observer sees both motion of the objects and apparent motion caused by movement of his or her viewpoint relative to the scene.

A further aspect of the present invention provides additional methods of synthesizing an image of a scene corresponding to the image which would be observed from a virtual viewpoint. Methods according to this aspect of the invention also include the step of providing a plurality of discrete images corresponding to the images of the scene observed from plural discrete viewpoints on a viewpoint locus, each such discrete image including an array of pixel data in first and second dimensions. Methods according to this aspect of the invention, also include the step of deriving transform images from the discrete images. The transform images desirably include a first epipolar image. Each epipolar image desirably includes a plurality of line sets. Here again, each line set includes one line of pixel data in the first dimension from each discrete image. All of the lines in each line set correspond to the same location in the second image direction. The lines of pixel data within each such line set are ordered in an order corresponding to the order of the discrete viewpoints from which the discrete images were taken.

A method according to this aspect of the invention preferably includes the step of providing virtual viewpoint image pixel data for a plurality of virtual viewpoint image pixel lines extending in the first image dimension and offset from one another in the second image dimension. The pixel data for the synthetic image lines is provided by associating each line of the virtual viewpoint image with a lineset of the first epipolar image corresponding to the location of the that line in the second image dimension. For each pixel within each such virtual line, synthetic pixel data is derived from other pixel data in the associated lineset.

For example, where the first dimension is the horizontal image dimension and the second image dimension is the vertical, each lineset will include lines taken from each discrete image at the same vertical location. Each line of the virtual viewpoint image at a particular vertical location is associated with the lineset at that vertical location and the pixel data in the virtual viewpoint image line is derived from the pixel data of the so-selected lineset. Preferably, the step of deriving the synthetic pixel data for the virtual viewpoint image line includes the steps of selecting a plurality of lines within the associated lineset corresponding to discrete viewpoints in-the vicinity of the synthetic viewpoint and deriving the synthetic pixel data from the pixel data in the so-selected lines of the lineset. The pixel data for each synthetic pixel may be derived by choosing a plurality of pixels in these selected lines adjacent-the position of the synthetic pixel in the first image dimension and deriving the synthetic pixel data in the chosen pixels of the selective lines. The selected lines in the lineset desirably include lines corresponding to discrete viewpoints bracketing the virtual viewpoint. For each synthetic pixel, the chosen pixels have first dimension locations bracketing the locations of the synthetic pixel in the first image dimension. Stated another way, the chosen pixels of the selected lines are the pixels surrounding the location of the synthetic pixel in question in the transform image, i.e., in the lineset of the epipolar image. The step of deriving pixel data from these chosen pixels of the selected lines may include the step of interpolating the pixel data of these chosen pixels. Such interpolation can be performed readily, using standard video processing hardware and interpolation software commonly used for other purposes. Methods according to this aspect of the present invention constitute a special case of the more general methods discussed above. That is, methods according to this aspect of the invention are normally used only to provide images for virtual viewpoints interpolated between the discrete viewpoints of the discrete images on the discrete image. These interpolated viewpoints can be displayed to a viewer or also can be used as base images in the more general system discussed above.

A further aspect of the present invention incorporates the realization that data arranged in the two-dimensional transform images discussed above, such as the epipolar images, can be compressed and stored or transmitted in compressed form, and then subsequently decompressed for use in image synthesis steps as described above. The degree of data compression achievable through compression of the transform images is, in many cases, greater than the degree of data compression achievable by compressing the original, discrete images using comparable compression algorithms. Thus, it is advantageous to store and transmit the images in the form of compressed transform images, such as compressed epipolar images, and then decompress the transform images. Because the transform images are two-dimensional images and desirably images consisting of data for plural pixels or lines, the transform images can be compressed and decompressed using essentially the same methods as used for ordinary video images as, for example, run-length encoding, MPEG and JPEG compression techniques.

Still further aspects of the invention incorporate the realization that the transform images, such as the epipolar images, can be combined with one another. Thus, methods according to this aspect of the invention can provide a first set of two-dimensional transform images such as a first epipolar image derived from one set of discrete images and transforming the plural discrete images of the second set into a second transform image such as a second epipolar image and then combining the two transform images with one another to yield a combined transform image. The step of combining the transform images may include the step of combining pixel data of each lineset in the first epipolar image with a corresponding lineset of the second epipolar image. Such combination can be performed using essentially the same techniques as are used to combine plural video images in conventional television equipment. For example, the combining step may include the step of deriving pixel data for each pixel in the combined lineset by combining pixel data for the corresponding pixel data of the lineset from the first image with the pixel data from the corresponding pixel in the lineset from the second image according to a combining formula which varies from pixel to pixel. The combining formula may be a function of the pixel data in one or both linesets as, for example, in so-called "chroma keying".

These and other objects, features and advantages of the present invention will be more readily apparent from the detailed description of the preferred embodiments set forth below, taken in conjunction with the accompanying drawings.

BRIEF DESCRIPTION OF THE DRAWINGS

FIGS. 5 and 6 are schematic representations of linesets utilized in operation of the system.

FIG. 8 is a view similar to FIG. 4 but depicting a virtual viewpoint image as created by the system.

FIG. 9 is a chart depicting, on an enlarged scale, a portion of the lineset depicted in FIG. 6.

DETAILED DESCRIPTION OF THE PREFERRED EMBODIMENT

Figure 1:
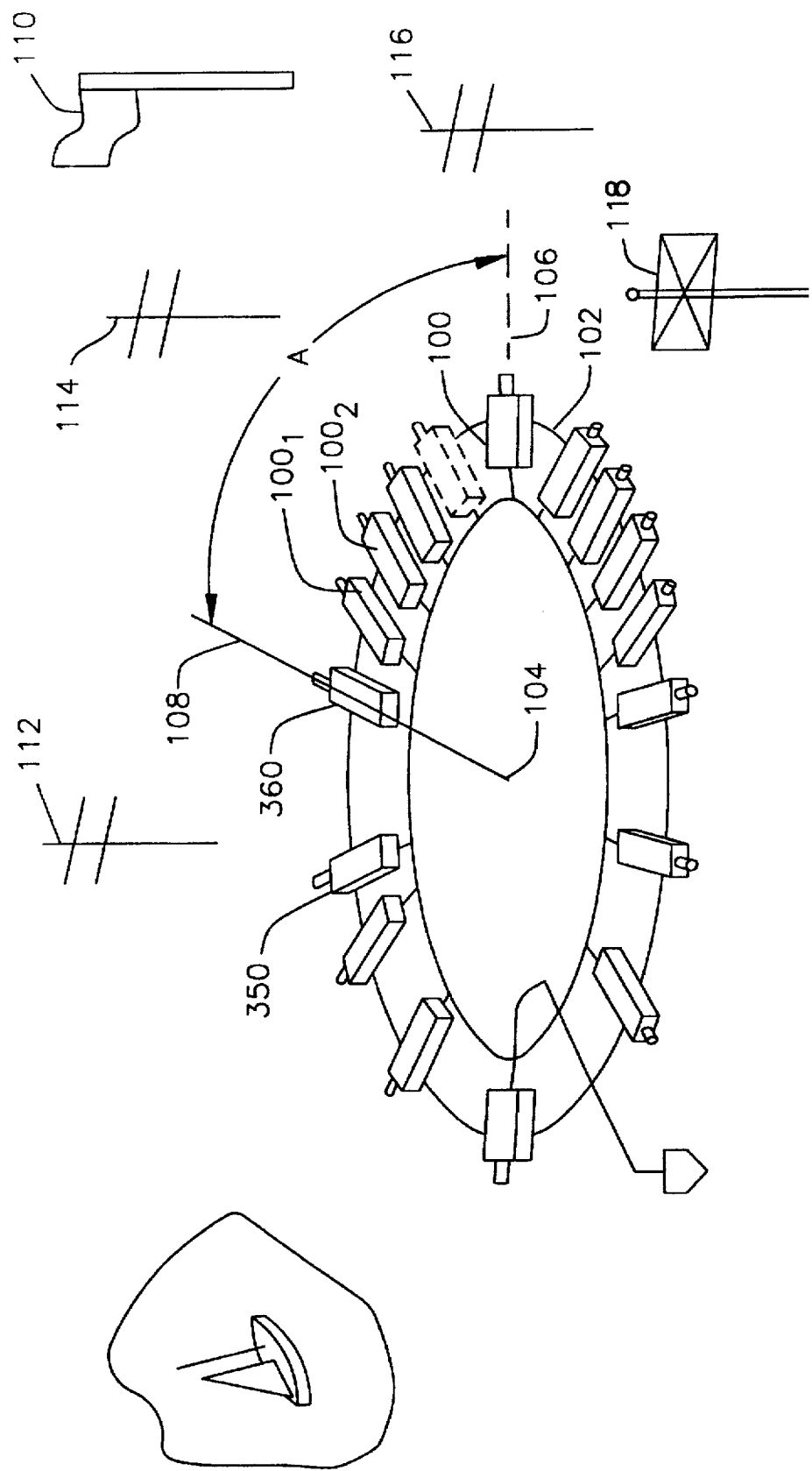
FIG. 1 is a diagrammatic, perspective view showing portions of a system in accordance with embodiment of the invention in conjunction with a real scene to be depicted.

Apparatus in accordance with one embodiment of the present invention includes a plurality of video cameras 100 arranged on a horizontal curvilinear locus 102 which in this embodiment is a circle having a center of curvature 104. The cameras are arranged so that each camera 100 points substantially radially outwardly away from center 104. That is, the optical axis 106 of each camera is a radial line passing through the center 104, and so that the lens of each camera is positioned at the same radial distance from the center. Each of cameras 100 is positioned at a different viewpoint. Each viewpoint may be denoted by a viewpoint location from an index or zero degree reference line 108. As illustrated, 360 individual video cameras are provided, one per degree, around the entire periphery of circle 102. Each camera 102 may be essentially any type of video camera as, for example, a conventional raster-scanning scanning image tube type or a solid state type such as a CCD. As further discussed below, the images captured by the cameras will ultimately be converted to pixel data representing pixels in horizontally, oriented lines. For that reason, it is preferred to provide the cameras so that the real elements constituting the raster lines of the camera are already aligned in the horizontal direction, i.e., parallel to the plane of locus 102. Alternatively, each image can be rotated about the axis of the camera using conventional, well-known video processing techniques, to provide the image restated in a series of horizontal lines. All of cameras 100 are synchronized, so that each camera captures a frame at the same time. As illustrated in FIG. 1, the camera set is capturing a real scene, including objects such as a flag pole and flag 110, utility poles 112, 114 and 116 and sign post 118. These and other objects may entirely surround the camera array, and include moving objects as well as still objects.

Figure 2:
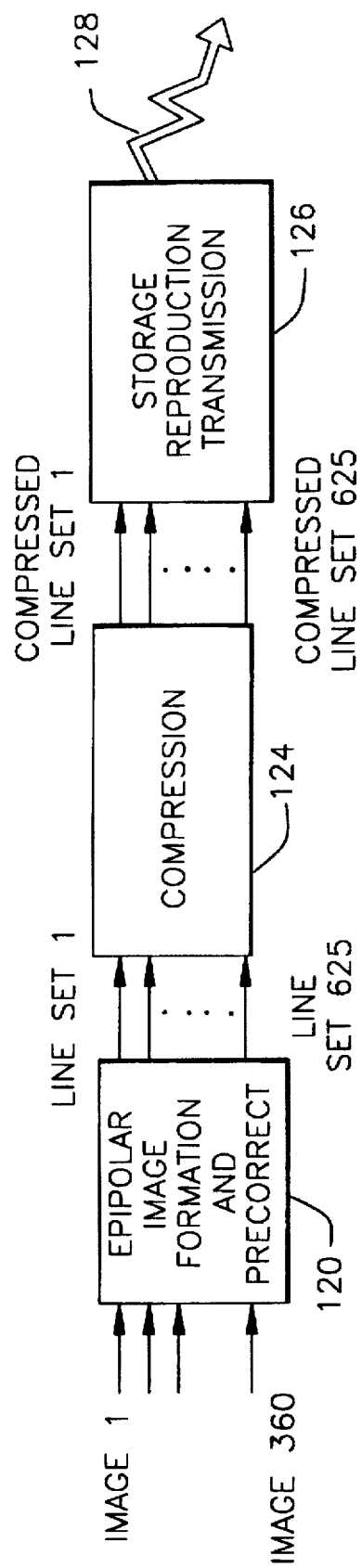
FIG. 2 is a functional block diagram depicting further portions of the system of FIG. 1.

Cameras 100 are connected to a precorrection and epipolar image formation unit 120 (FIG. 2), so that each camera 100 feeds an individual image into this unit. Unit 120 is arranged to correct each of the individual images and then to transform the group of images into an epipolar image comprising a series of linesets as discussed below. Each including some of the information from each one of the incoming images.

Unit 120 is connected to a compression unit 124. Unit 120 feeds each of the linesets to the compression unit. Compression unit 124 incorporates apparatus for compressing two-dimensional images using standard techniques commonly applied to standard video images. Such techniques can be applied directly to the linesets produced by units 120. The compression unit 124 is connected to storage, reproduction and transmission unit 126. This unit may incorporate any available form of equipment for storing, reproducing or transmitting data such as, for example, equipment for modulating the data onto a suitable carrier and broadcasting it or transmitting it through wire or fiber optic links, or equipment for recording the data on conventional media such as magnetic or optical storage media. Unit 126 treats each of the compressed linesets received from compression unit 124 independently.

Figure 3:
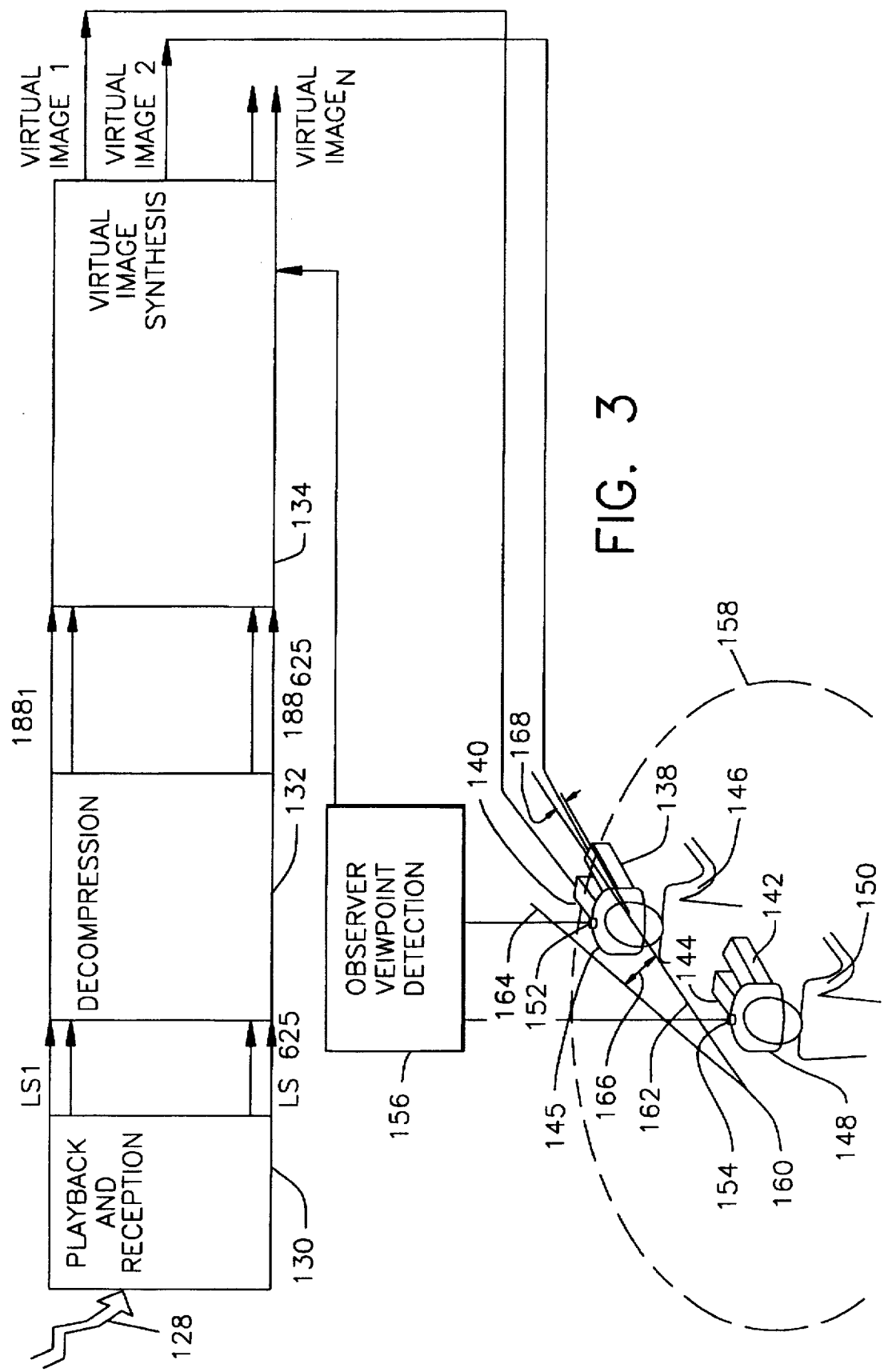
FIG. 3 is a further functional block diagram depicting still further portions of the same system in conjunction with observers.

Unit 126 is linked via a one-way communications channel 128 to reception and playback unit 130 (FIG. 3) adjacent the location of observers who will view the images produced by the equipment. Communications channel 128 need only provide one-way communication of the compressed aligned sets; it need not provide instantaneous communications. For example, where the compressed linesets are recorded by unit 126 on media such as tapes or disks, communications channel 128 may include distribution of the physical media by conventional channels as, for example, sale of the same in stores. Alternatively, communications channel 128 can be arranged for substantially instantaneous, real time transmission of the Compressed linesets as, for example, in a conventional broadcast, cable or fiber channel. Also, although only one playback and reception unit 130, and only one group of associated equipment is illustrated in FIG. 3, it should be appreciated that any number of such playback and reception units, and the associated components discussed below, can use the same data from unit 126 either simultaneously (where the communication channel operates instantaneously), or at different times (where the channel provides delay, such as distribution of recorded media).

Playback and reception unit 130 is arranged to recover data from communications channel 128 as, for example, by demodulating broadcast or cable signals or playing back recorded media, so as to provide the linesets in compressed form, substantially as provided by compression unit 124. Here again, each lineset is handled independently. Decompression unit 132 is arranged to reverse the compression applied by compression Unit 124 to each lineset. Here again, the conventional techniques used to process ordinary two-dimensional video images can be employed. Compression unit 132 provides the decompressed data representing the linesets to a virtual image synthesis unit 134.

The system further includes display devices 138, 140, 142 and 144. As illustrated, display devices 138 and 140 are incorporated in a helmet or goggles unit 145 which can be used by an observer 146, the display devices 138 and 140 being arranged to display their respective images to the two eyes of the observer 146. Likewise, display devices 142 and 144 are mounted to a helmet unit 148 which is worn by an observer 150. Devices 142 and 144 are arranged to display their respective images to the right and left eyes of the observer, respectively. The display devices and helmets may be conventional units of the type employed for so-called "virtual reality" displays. Typically, these include small cathode ray tubes or active matrix displays mounted to the helmet, with appropriate eye pieces linking each such display to the eye if the observer.

Helmet unit 145 includes a magnetic locating transmitter 152, whereas unit 158 includes a similar magnetic locating transmitter 154. The system further includes an observer viewpoint detection unit 156. The observer viewpoint detection unit detects the magnetic fields from transmitters 152 and 154 and determines the positions and orientations of each of the helmet units 145 and 148. Magnetic location and orientation detection systems per se are well-known, and are used, for example, in virtual reality systems and in systems for detecting the position and orientation of a pilot's helmet in military aircraft applications. Examples of such detection systems include those described in U.S. Pat. Nos. 4,613,866; 5,109,194 and. 4,054,881. Any other operable location and orientation detection system, such as an optical, mechanical or electromechanical system can be used instead of the magnetic system. Viewpoint detection unit 156 provides a signal to virtual image synthesis unit 134 representing the viewpoint of each of display devices 138, 140, 142 and 144. This viewpoint signal is derived from the location and orientation of the associated helmet 145 or 148, and from information concerning the position and orientation of each display device with respect to the associated helmet. Thus, the viewpoint for display device 140 will differ from that for display device 138, this difference corresponding to the difference in viewpoints of the observer's two eyes. However, these two viewpoints will change in unison as observer 146.moves or turns. Likewise, the viewpoint for display device 142 and 144 will differ from one another, but viewpoints 142 and 144 will change in unison as observer 150 moves and turns.

The observer viewpoint signals provided by unit 156 denote each viewpoint as position and orientation of the observer associated with each display device, i.e., the position of the observer's eye, in terms of an observer locus 158 corresponding to the real locus 102 that was originally used for cameras 100. Thus, each viewpoint is provided in terms of observer viewpoint radius from an observer center point 160, to the eye of the observer and an observer viewpoint angle 166 from an observer index line 164 corresponding to the index line 108 if the real camera locus. Also, the observer viewpoint detection unit determines an observer step angle 168 between the optical axis of the observer's eye and the radius from center point 160 to the eye. This angle is determined based upon the position of the observer's head, from the movements of helmet 145 as reported by magnetic transmitter 152. If desired, the system can also incorporate devices for detecting movements of the eye relative to the head, also called "pupillary tracking" devices, to provide an even more accurate eye position.

As further described below, virtual image synthesis unit 134 converts the linesets received from compression unit 132 into virtual images for display by each of the display devices. Thus, a first virtual image will be fed to display device 140 whereas the second, different virtual image will be fed to display device 130 and still other virtual images will be passed to display devices 142 and 144.

Figure 4:
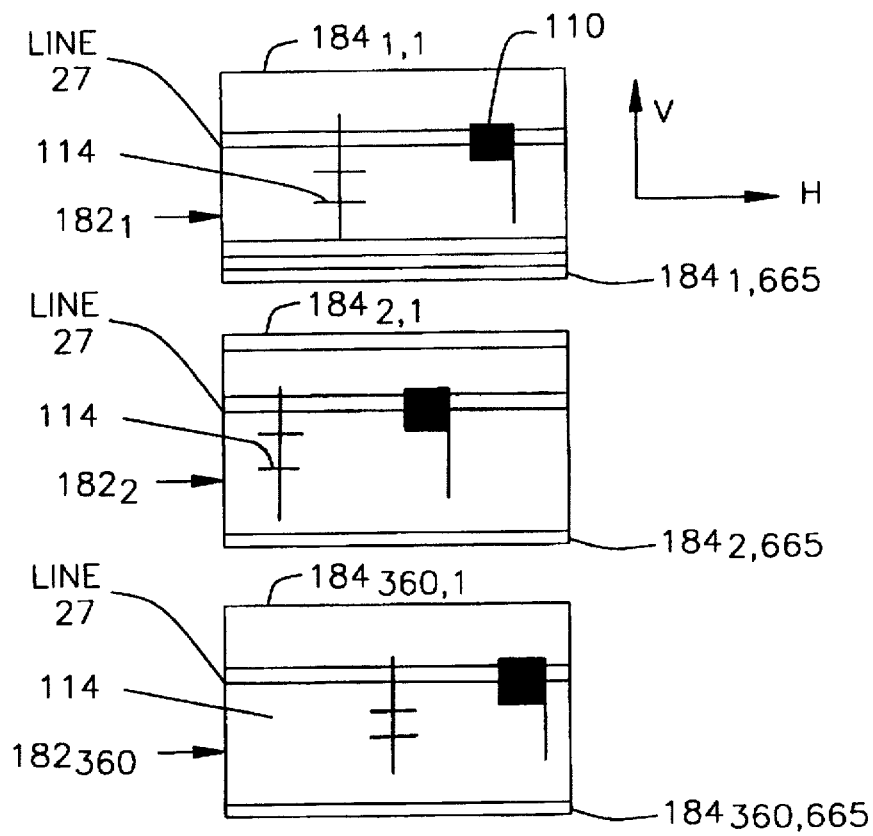
FIG. 4 is a schematic representation of several discrete images as initially captured by the system.

In operation, each camera 100 captures a conventional, two-dimensional video image of the scene. As indicated in FIG. 4, each video image includes pixels in a two-dimensional array, including a first or horizontal image direction H and a second or vertical image direction V. As best appreciated with reference to FIG. 4, the position of each pixel in the first or horizontal direction H represents the offset angle B between the optical or view axis 106 of the image (the viewing axis of the camera which captured the image) and a ray 180 from an object in real space to the particular pixel. Stated another way, the horizontal or first image dimension represents a real dimension of the viewed scene, namely, the offset angle or angular displacement of the object represented in a particular pixel from the optical axis 106 of the camera. Similarly, the location of any pixel in the image represents the vertically directed offset angle (not shown) between the optical axis 106 and the ray from the real object represented by the pixel. Thus, as shown in FIG. 4, image $182_1$, from camera $100_1$ includes conventional representations of light and dark objects on a two-dimensional field, representing a projection of the real, three-dimensional image onto an image plane perpendicular to optical axis $106_1$ of camera $100_1$.

In FIG. 4, and in the succeeding figures, the images are shown as pictorial images, i.e., relatively dark areas in the real scene being shown as dark areas in the image and so on. This representation is used solely for ease of understanding. In fact, the video images produced by the cameras incorporate electronic signals representing the optical qualities of the various pixels in the standard manner of video signals. The particular optical qualities will vary with the type of video images. In a monochrome system, each pixel may have associated with it only a single analog signal level or digital number representing brightness. In a color system the data for each pixel may include analog or digital values for several parameters, such as luminance and a pair of chrominance parameters, or else may include separate primary color brightness signals such as red, green and blue. In the conventional fashion, the pixels constituting each image are arranged in lines, the lines extending in the first image direction. For example, image $182_1$ includes 625 pixel lines extending in the first image direction, the first such pixel line $184_{1,1}$ representing the top of the image and the last such pixel line $184_{1,625}$ representing the bottom of the image. Likewise, the image from viewpoint or camera $100_2$ includes a similar array of pixel lines starting with top pixel line $184_{2,1}$ and ending with bottom pixel line $184_{2,625}$ and so on, through the image from 360th camera or viewpoint $182_{360}$, which include pixel lines $184_{360,1}$ through $184_{360,625}$.

The real physical components utilized to provide images $182_1$ through $182_{360}$ ordinarily suffer from some distortion. That is, the first image dimension or horizontal image dimension H may not exactly represent the offset angle B (FIG. 7) ray and the optic axis 106 and the vertical dimension may not exactly represent the vertical rear angle. Unit 120 (FIG. 2) is arranged to apply standard distortion correcting techniques to substantially remove these effects. As is well known in the video processing arts, a distorted image can be corrected by applying an appropriate mathematical mapping based upon prior knowledge of the distortion, the data from the various pixels is remapped so that the data originally included in a particular pixel of the distorted image is transposed into a different pixel in the corrected image. Image correction techniques of this nature are well-known in the standard video arts, and hence are not further described herein. Unless otherwise indicated, references hereinbelow to images 182, or to the pixels from such images, should be understood as referring to the corrected versions.

After distortion-correcting each of images 182 captured by cameras 100 at a particular time, epipolar image unit 120 reorders the data in all of these images 182 into an epipolar image incorporating a number of linesets. One such lineset 186 is depicted schematically in FIG. 5. The number of linesets 186 in the epipolar image is equal to the number of lines in each of the starting images. Thus, using the starting images shown in FIG. 4, each of which contains 625 lines, each epipolar image will include 625 such linesets. Each lineset includes pixel data from all of the original images 182 at the same location in the vertical or second image dimension. That is, the Nth lineset includes the Nth line of pixels from each image. For example, lineset $186_{27}$ in FIG. 5, includes the 27th line from image $182_1$ (line $184_{1,27}$); the 27th line from image $184_2$ (line $184_{2,27}$) and so on through the 27th line from image $184_{360}$. These lines are ordered in an order corresponding to the order of the viewpoints of the various images, i.e., line $184_{1,27}$, $184_{2,27}$ . . . , $184_{360,27}$. Each of the other linesets, from $186_1$ through $186_{625}$ has the lines arranged in the same order.

Figure 5:
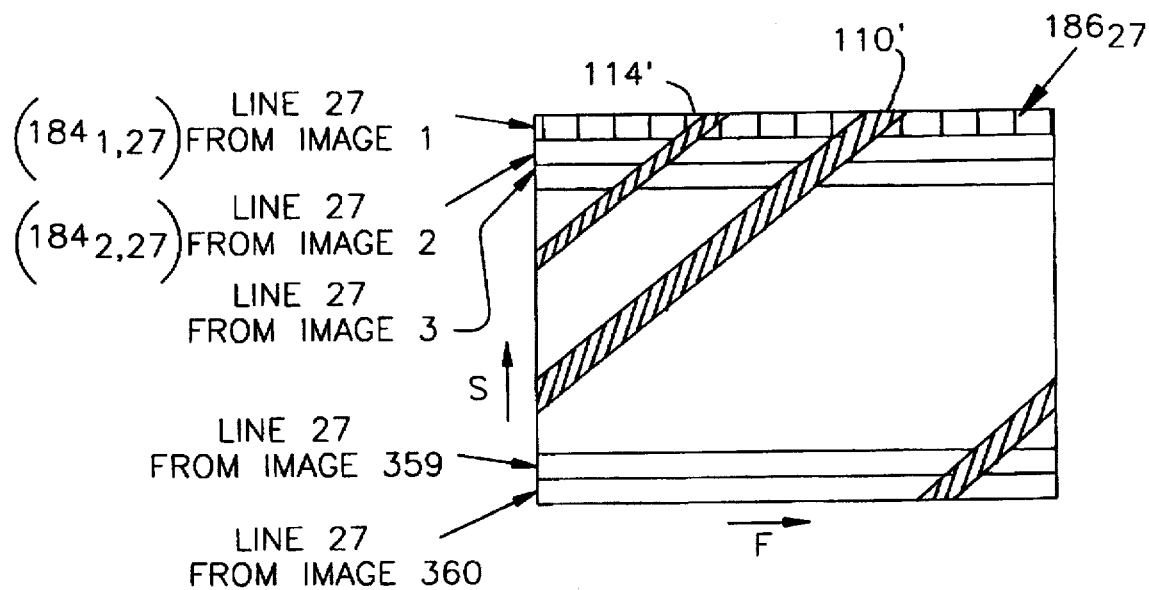

Within each lineset, as initially provided and as seen in FIG. 5, the lines of pixels extend in a first epipolar direction F and the lines are ordered in a second epipolar direction S. Unit 120 modifies each lineset to the form shown in FIG. 6. Thus, unit 120 applies an initial offset of M pixels between each pair of adjacent lines in the image;

$$M=(R/B^*)\times P$$

where: R is the difference in the viewpoint angle A between the viewpoints of two successive images, i.e., the difference in angle A between camera $100_n$ and camera $100_{n+1}$; B is the horizontal field view of each camera, i.e., the difference between the maximum and minimum values of the horizontal offset angle B between ray 180 and the axis of the image and P is the number of pixels per line in the image. In effect, the offsetting process removes the effect of the differing camera angles and hence the differing images axis angles 106 from the epipolar image linesets. The relative positions of the pixels in the offset epipolar image are the same as if all of the cameras were pointed in the same direction from the different viewpoints. In the modified lineset 188 (FIG. 6) the first dimension F corresponds to direction of the ray to the depicted feature relative to the line 108. That is, in the modified lineset, the coordinate for the first dimension F to any pixel corresponds to the azimuth angle Z, i.e., the angle between the index line 108 and the ray 180 from the pixel in question to the real object imaged. For pixels taken from any particular image $182n$ from camera $100n$, the azimuth angle will be the sum of the viewpoint location $A_n$ from the reference line to the axis of the image and the offset angle B from the image 106 to the rear.

The second dimension S of each modified lineset 188 corresponds to the viewpoint, i.e., the particular image from which the lines were derived. As seen in FIG. 6, the various features in real space, depicted found in the individual discrete images 182 form linear features in the epipolar linesets. The flag on flagpole 110 forms linear feature 110' whereas telephone pole 114 forms stripe 114'. Stripe 110' is substantially vertical. This indicates that the ray azimuth does not change appreciably with viewpoint, i.e., that the flag is far away. The stripe representing an object at infinite distance has a substantially constant ray azimuth and hence substantially zero change in a first direction F throughout its entire extent within the epipolar image lineset. By contrast, stripe 114' representing a portion of utility pole 114 has a substantial slope or change in the first dimension or ray azimuth with viewpoint or second dimension S. The physical meaning of this change is that there is a large degree of parallax causing the apparent position of the telephone pole to shift as the viewpoint from which the image is taken shifts. The initial linesets 186 (FIG. 5) share the same properties. That is, stripe 110' as seen in the initial lineset has a slope substantially less than that of stripe 114'. However, the slopes of both stripes are exaggerated substantially in FIG. 5 by the effect of camera rotation, which is removed in FIG. 6.

Although only two stripes are illustrated in FIGS. 5 and 6, every feature of the images captured by cameras 100 will be reproduced as a strip-like feature in the linesets of the epipolar images. Thus, each lineset would include far more features than are illustrated. Also, only one lineset is illustrated in each of FIGS. 5 and 6. The actual epipolar images again includes a lineset for every horizontal scanning line in the original images. The epipolar image in this arrangement includes all of the information captured by the original cameras. Once again, the linesets are depicted in graphical form in FIGS. 5 and 6, and indeed can be displayed like any other two-dimensional image. However, it should be appreciated that manipulation of the data to form the linesets normally will be accomplished in digital form. Thus, the data for each pixel in each image may be stored at an address representing the location of the pixel within the original image 182 (FIG. 4). The data can be reformulated into the epipolar image linesets merely by assigning addresses to the data constituting each lineset from memory in a new order, so that the pixels from one line of a first image will read out followed by the pixels from the same line in the next image and so on. Stated another way, it is not essential that the physical storage units used to store the data have structures corresponding to the original lines of the image or to the epipolar image; the image structure may be specified entirely by data and address values stored in memory. However, memory structure such as those commonly referred to as VRAM or Video Random Access Memory, adapted to receive and pass data in the form of a two-dimensional raster can be utilized advantageously in handling and processing the epipolar image linesets.

The foregoing description refers to formation of a single epipolar image, including only one series of 625 linesets. This process is repeated continually as new images are captured by cameras 100. Preferably, all of the cameras 100 operate in synchronism, so that each camera captures a new frame or a new field simultaneously with the other cameras. In this regard, unit 120 may form the epipolar images in real time, so that each epipolar image is formed at substantially the same time as the initial images captured. Alternatively, the epipolar image formation unit may operate on previously stored images captured by cameras 100. Thus, the original discrete images captured by the individual camera may be stored on conventional tape, disks or other media, preferably along with timing signals so that the various stored images can be synchronized, and the stored images can be played back and converted to epipolar images.

The epipolar images are then passed to compression unit 124. As aforementioned, compression unit 124 includes conventional video compression hardware and software. The linesets may be compressed using essentially the same algorithms and techniques as employed compression of standard video images. Each lineset can be treated essentially as the equivalent of a field of video information. Each such lineset may be compressed by techniques involving only manipulation of the data within the individual lineset as, for example, run length encoding to compress lines of constant-value data into individual data words denoting the length of the constant value line. Alternatively or additionally, corresponding linesets in successive epipolar images may be compared with one another to detect changes, and a compressed signal incorporating only the change data may be provided. Examples of the former system include the Joint Photographic Experts Group or JPEG standard for still images, whereas an example of the latter includes the Motion Picture Experts Group or MPEG standard.

The compressed information from compression unit 124 is passed to the reproduction and transmission unit 126. Here again, the various linesets of each epipolar image are maintained separate from one another. Thus, the data relating to lineset $186_{27}$ are handled separately from the data relating to lineset $186_{28}$ and so on. Again, the data is in essentially the same form as standard, compressed two-dimensional fields, one such compressed field corresponding to each lineset, and thus conventional techniques may be used. As mentioned above, the data transmission may include either instantaneous transmission or recordation of the data onto conventional media.

The data is received by playback and reception unit 130, either simultaneously with its processing by unit 126 or later in the case of recorded data. Unit 130, in conjunction with decompression unit 132, recovers or plays back the data to provide a series of epipolar images, effectively reversing the effects of compression and storage units 124 and 126. The internal structure and algorithms used by decompression unit 132 and playback and reception 130 will be determined by the precise structure of units 124 and 126. Here again, conventional algorithms, such as those used to process conventional two-dimensional raster images can be employed. Decompression unit 132 thus provides the series of epipolar images, each including 625 modified linesets 188 as discussed above with reference to FIG. 6. These epipolar images are provided as a series in time so that the timing between epipolar images corresponds to the timing between capture of the original image sets by cameras 100.

Virtual image synthesis unit 134 transforms the epipolar images into a series of visual images for the display devices associated with each observer, based upon the viewpoint information for that display device provided by observer viewpoint detection unit 156. As noted above, this information includes the radial distance from center point 160 of the observer frame of reference to the observer's eye associated with the display device; the observer viewpoint angle 166 between observer index line 164 and the radial line 162 from center 160 to the observer's eye; and the observer skew angle 168 between the central axis of the observer's eye and the radial line 162. This viewpoint data, taken in the observer frame of reference, defines a virtual viewpoint in the camera frame of reference. That is, for each viewpoint detected, the system forms a virtual image corresponding to the image which would have been captured by a camera at a virtual viewpoint in the camera frame of reference at a virtual viewpoint 190 (FIG. 7) having a radial distance 193 from center 104 equal to the radial distance from center 160 of the observer's eye; having a virtual viewpoint location angle 191 from index line 108 (FIG. 7) equal to the observer viewpoint location angle 166 from index line 164 (FIG. 3) and having a viewing axis 195 at a virtual viewpoint skew angle 192 to the radial line 193 corresponding to the observer viewpoint skew angle 168. The system synthesizes a virtual image 200 (FIG. 8) which would have been captured by a camera disposed at the virtual viewpoint 190. In each case, the system constructs each line of the virtual image from the corresponding lineset in the epipolar image. Each virtual image, like each real image captured by each one of the cameras 100, has a first or horizontal dimension corresponding to the angle B between the axis of the image and the ray to the object represented by the pixel and again has a vertical dimension corresponding to the vertical angle (not shown) between the image axis and the ray. Here again, each virtual image 200 includes lines 202 of pixels 204, the lines 202 being ordered in the same manner as the lines 184 of the original images 182. Image synthesis image 134 forms each line 202 in virtual image 200 from the corresponding lineset 188 in the epipolar image. That is, line $202_n$ is reconstituted from lineset $188_n$, incorporating information from the Nth line of each original image 182.

Figure 7:
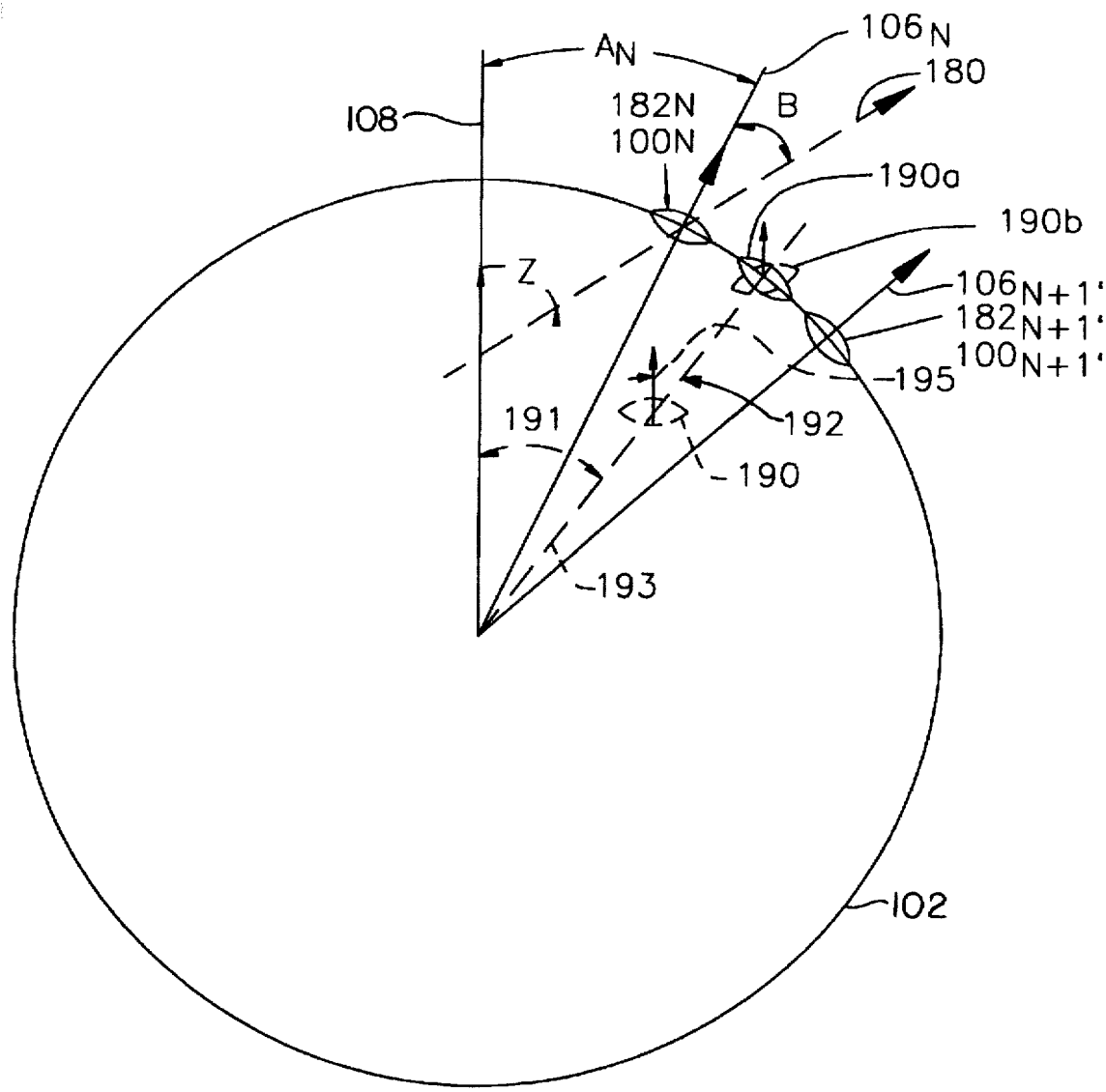
FIG. 7 is a diagrammatic plan view depicting various real and virtual viewpoints used in the system.

In a first step of the reconstruction process, the system selects a base image, and hence base lines of pixels 184s, for which the viewpoint location angle A corresponds to the viewpoint location angle 191 of the virtual viewpoint 190. That is, the system uses the second dimension information S to locate the desired line of pixels for use in the synthesis. Where the viewpoint location angle 191 is intermediate between the viewpoint location angles $A_n$ and $A_{n+1}$ of the discrete images 182, the system synthesizes an intermediate line of pixels by interpolation between the pixel values for corresponding pixels in adjacent lines. Thus, the viewpoint location angle 191 for the virtual viewpoint may lie between the viewpoint location angles A for images $182_n$ and $182_{n+1}$ (FIG. 7). In this case, the values constituting the pixel data in line 184s are derived by interpolation between the corresponding values in lines $184n$ and $184_{n+1}$. Such interpolation can be performed using standard techniques used in resolution enhancement of two-dimensional video raster images. One simple technique involves direct linear interpolation between the values of the pixel data in the adjacent lines such that $D_s=D_n+K(D_{n+1}-D_n)$ where:

$D_n$ is the data in a pixel in line $184_n$;

$D_{n+1}$ is the data in the pixel at the same position F in line $184_{n+1}$;

$D_s$ is the data of the pixel in line $184_s$ at the same position F

K is defined by:

$$K=(la_{191}-A_n)/(A_{n+1}-A_n)$$

That is, pixels directly above and below one another as seen in the offset epipolar image are combined. For a few pixels at each end of line of line 184s, the pixel value in one of lines $184_n$ and $184_{n+1}$, will be missing. In this case, the pixel value present in the other line can be used directly in line $184_s$. The values in each pixel of base view line 184s will be closer to the values in line 184n if the location angle 191 of the virtual viewpoint is close to the location angle $A_n$ of camera 100n. This interpolation step in effect generates the pixel lines for a base image or virtual viewpoint image 190a at the correct location angle 191 but still disposed on the camera locus 102 (FIG. 7) and still having a directly radial view direction, i.e., a skew angle 192 of zero.

In the interpolation process described in the preceeding paragraph, the system chooses pixels above and below one another in the offset epipolar image, and thus applies an offset distance equal to the initial offset M discussed above, used to form the offset epipolar image. The system can modify this initial offset during the interpolation process by an iterative process, using a variable offset distance which changes on each iteration. In the iterative process, the system first chooses pixels in the selected lines of the epipolar image so that the first direction locations of the chosen pixels are offset from one another in the first direction by an initial offset, as in the foregoing process. The first direction locations of the chosen pixels may bracket the first direction location of the synthetic image pixel. The system then tests the pixel data in the chosen pixels of the selected lines to determine if the pixel data in said chosen pixels match one another within a preselected limit. If not, the system may increase the variable offset distance between the chosen pixels and repeat the testing procedure. This repetitive process is continued, using a different value for the variable offset distance on each repetition, until the pixel data of the chosen pixels matches.

The original pixel lines 184 of image 188 represent zero skew angle. All of the images used to form the epipolar image were images taken with radially directed view axes. Each line 184s, derived by interpolation between pixel lines of the epipolar image, also represents a zero degree skew angle.

Image synthesis unit 134 further modifies interpolated line 184s to show the effect of a non-zero skew angle. To create a new line of pixels 210 representing the desired virtual image or non-zero skew angle image, the system shifts the pixel data in interpolated line 184s by a preselected number J pixel positions where;

$$J=(F/SA_{192})\times P$$

B is the field view of the original camera which captured the pixel line, i.e., the difference between the maximum and minimum values of image angle B;

$SA_{192}$ is the skew angle 192; and

P is the number of pixels in the line.

Figure 10:
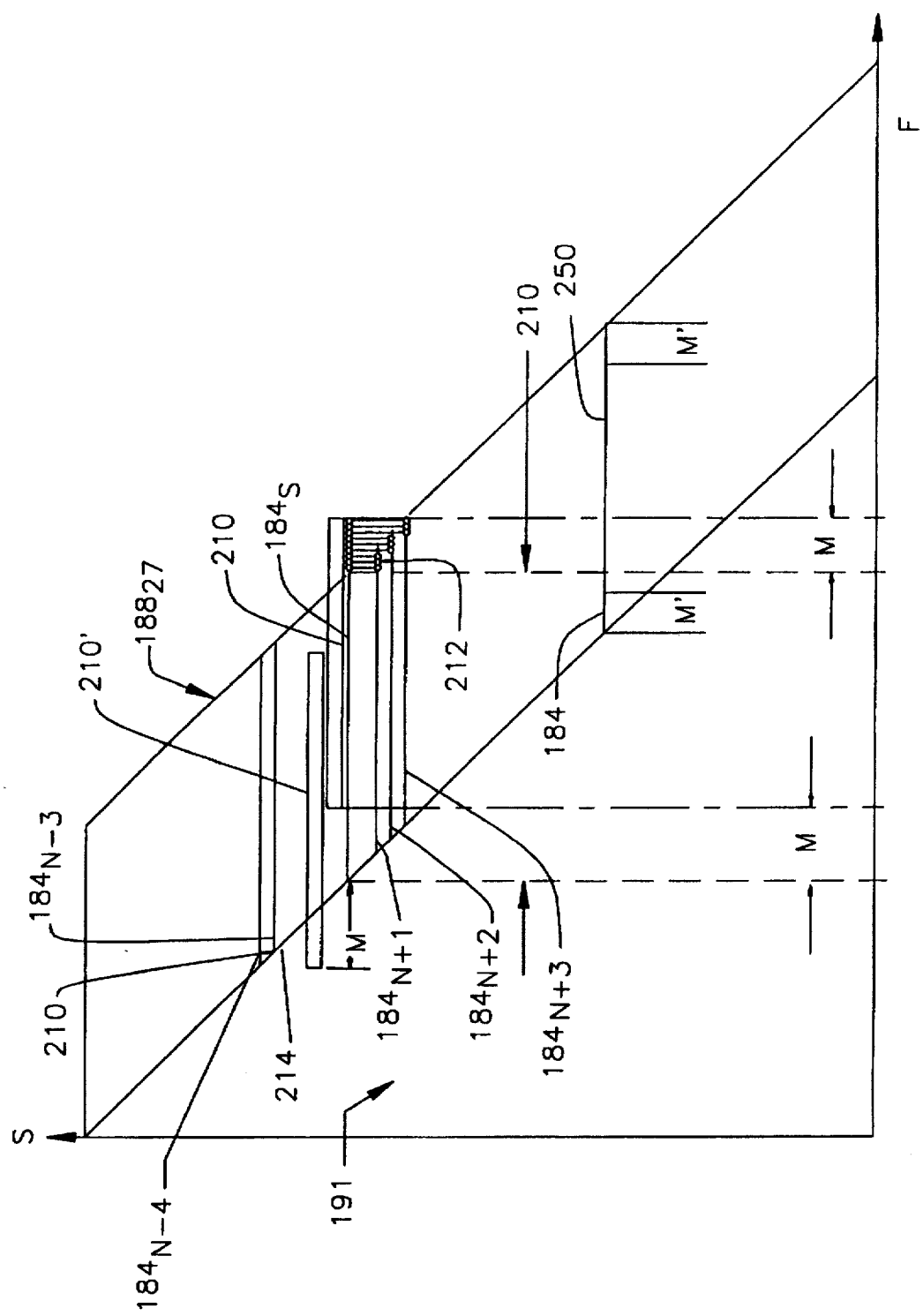
FIG. 10 is a further diagrammatic view of the line set depicted in FIG. 9, depicting a further operation.

Thus, where the skew angle is such that the new line 210 is shifted to the right, the system begins to create the new line 210 by copying the Jth pixel in line 184 (J pixels from the left-hand end of the line as seen in FIG. 10) into the first pixel position of line 210, the J+Ith pixel of line 184s into the second pixel position of line 210 and so on. This process continues until the system reaches the (P-J)th pixel of line 184s, which is the last pixel in that line. To provide the last J pixels in line 210, the system copies the pixel data from the closest pixels in adjacent lines of the offset epipolar image $188_{27}$. Thus, the system selects supplementary pixels 212 so that the ray azimuth or first dimension F increase progressively from the end of base view line $184_r$. Each supplementary pixel 212 is selected from the line 184 in the epipolar image closest to base view line $184_s$ in the second dimension and pixels at the required ray azimuth. Thus, as illustrated in FIG. 10, the first few supplementary pixels 212 are copied from line $184_{n+1}$, next adjacent to the base view line 184s. The next pixels are copied from line $184_{n+2}$ and so on. Thus, after reaching the last pixel in the base view line 184s, the system selects new supplementary pixels by incrementing the ray azimuth or first dimension F, finding the closest line 184 having a pixel at the incremented ray azimuth and copying the pixel data from that pixel into a pixel of virtual viewpoint line 210, and continuing in this fashion until line 210 has been filled in with P pixels.

Alternatively, where the skew angle 192 has the opposite sign, line 210 is shifted in the opposite direction relative to the base view line 184. That is, line 184 is shifted to the left as seen in FIG. 10, to the position indicated at 210' in the drawing. In this instance, the system derives the first J pixels of line 210', adjacent the left-hand end of the base view line 182s from the closest lines 184 in the image. Thus, the system starts at a ray azimuth or first-dimension value F equal to the ray azimuth of the first pixel in base view line 184s minus the skew angle 192. The system selects the line with the viewpoint location angle S closest to the virtual viewpoint location angle of 191 base view line 184s having a pixel at that ray azimuth as, for example, the line at $184_{n-4}$ having pixel 214 at the required ray azimuth. The system copies pixels from this line into virtual viewpoint line 210' until it reaches a ray azimuth at which line $184_{n-3}$ has its first pixel 216, whereupon the system begins copying pixel data from line $184_{n-3}$, and so on until the system reaches the beginning of base view line $184_r$. Thus, the system maps pixels from lines $184_{n-4}$ through line 184n and 184s on to virtual view image line 210'. That line may be displayed as the appropriate line of the virtual view image 200 (FIG. 8). Thus, where the lineset used to derive the line was image $188_{27}$, constructed from the 27th line of each discrete image, the resulting line 210' will be displayed as the 27th line $202_{27}$ of the virtual view image 200. The other lines of the virtual view image are constructed similarly from the other linesets. For any given virtual view point, the mapping of pixels is the same for every lineset in the epipolar image and every line of the virtual view image. Moreover, because this pixel mapping is a one-to-one mapping wherein the pixel data in one pixel of the epipolar image lineset is mapped into one pixel of the virtual view image line, the mapping can be accomplished simply by rearrangement of address pointers denoting the pixel data in the memory of a computer. There is no need to manipulate the pixel data values themselves in this stage.

Figure 11:
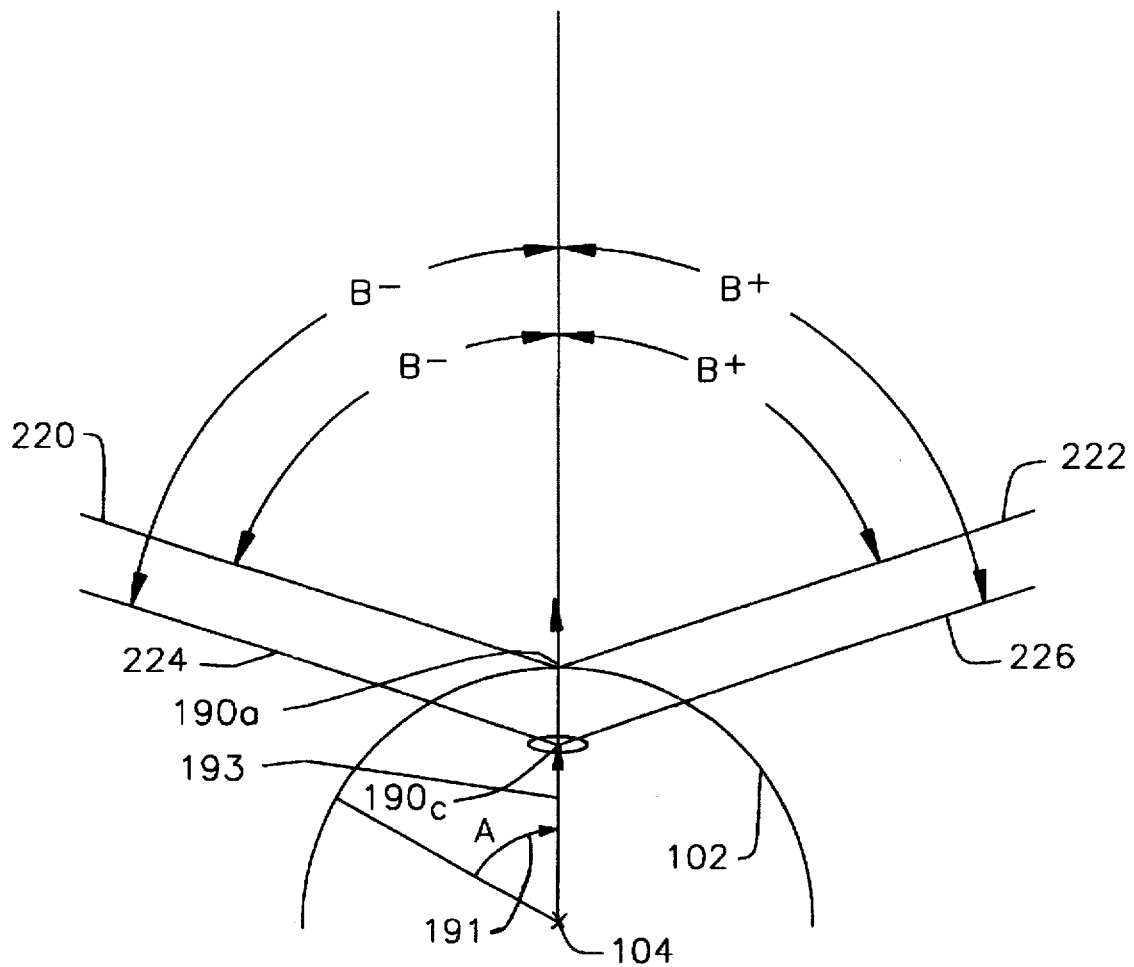
FIG. 11 is a view similar to FIG. 7 but depicting a further virtual viewpoint.

As best illustrated in FIG. 11, the virtual viewpoint $190_c$ may be disposed inside the locus 102 of the discrete viewpoints, i.e., closer to the center of curvature 104 than the locus. In physical terms, this means that the observer 146 is disposed inside the observer viewpoint locus 158. In FIG. 11, the virtual viewpoint has a skew angle of zero. That is, the virtual viewpoint 190$_c$ is disposed radially inwardly of locus 102 on a particular radial line, and the view direction is outwardly, along the radial line. Stated another way, a virtual viewpoint 192 represents the viewpoint which a virtual camera would have if it were disposed initially at viewpoint 190a and then moved radially inwardly while maintaining the same orientation. To maintain the same apparent field of view, the system must incorporate information from beyond the base image representing viewpoint 190a on locus 102. Thus, the base image has a preselected field of view 2B, maximum negative ray offset B– to maximum positive ray offset B+. The end pixels of the interpolated line 184s (FIG. 6) representing this line in the image at location 190a contain information only to edge rays 220 and 222. To provide a line representing the virtual view image at 190c, with the same apparent angular field of view from B– to B+, the image must incorporate pixel data from ray 224 to ray 226. Accordingly, the system derives each line of the virtual viewpoint image for viewpoint 190c by processing the corresponding lineset 188 to derive the interpolated base pixel line 184s having the appropriate viewpoint location angle 191 for viewpoint 190a, as above. The system then forms a virtual view image line 230 from the base pixel line 184s and from other lines in the lineset 188. One step in this formation process is to map the pixel data in the entire interpolated line 184s into a central region 228 of line 230. Line 180s and line 330 as a whole each include P pixel. The central region 228 includes C pixels where C/P is the proportion of the final field of view (from edge ray 224 to edge ray 226) encompassed by the original view (from line 220 to line 222).

Mapping of the P pixels in line 184s into the C pixels of central portion 228 may be performed by many standard algorithms. One simple algorithm is to map pixels 121 from line 184s onto line 228, but to skip one pixel in line 184s after each [P/(P–C)] pixels have been mapped. A higher-quality algorithm is to calculate the pixel data for each pixel within central portion 228 by calculating a spot in the first dimension of line 184 corresponding to the center point of the pixel in central region 228. Thus, each pixel of region 228 is treated as including [P/C] pixel positions on line 184s. The Nth pixel of central portion 228 thus is positioned at N(P/C) pixel positions on line 184s. Where this pixel position is not an integer, the value for pixel data is calculated by merging the pixel data from pixel centered on either side of the calculated position in line 184s, depending upon the proportionate distance between the calculated position and the center of each pixel in base line 184$_r$. For example, a pixel in central region 228 having calculated position 137.7 on line 184$_s$ has a distance of 0.7 from pixel 137 and a distance of 0.3 from pixel 138 on line 184$_s$ will have pixel data equal to the sum of 0.7 times the pixel data of pixel 138 and 0.3 times the pixel data of pixel 137.

In addition to forming the pixels in central region 228, the system maps pixel data from adjacent lines of the lineset 118 into end regions 232. In this instance, the system selects (P–C)/2 supplementary pixels for each end region 232. The pixels are selected at a constant ray azimuth in each end region. That is, all of the pixels mapped into end regions 232 have ray azimuth equal to the ray azimuth for the last pixel in the baseline 184s. Thus, the supplemental pixels mapped into end zone 232a of line 230 have ray azimuth equal to the ray azimuth of the right-hand end pixel of line 184s. This corresponds to the azimuth of right-hand edge ray 222. Conversely, the pixels mapped into end zone 232b of line 230 have ray azimuth equal to that of the left end pixel in baseline 184s, i.e., ray azimuth equal to the azimuth of left edge ray 220. In effect, the image from the base viewpoint 190a is expanded by filling in its edges with additional pixel data derived by looking parallel to the edges. This pixel data of course comes from the adjacent lines 184 through 184. Typically, one pixel is mapped from each adjacent line.

Figure 13:
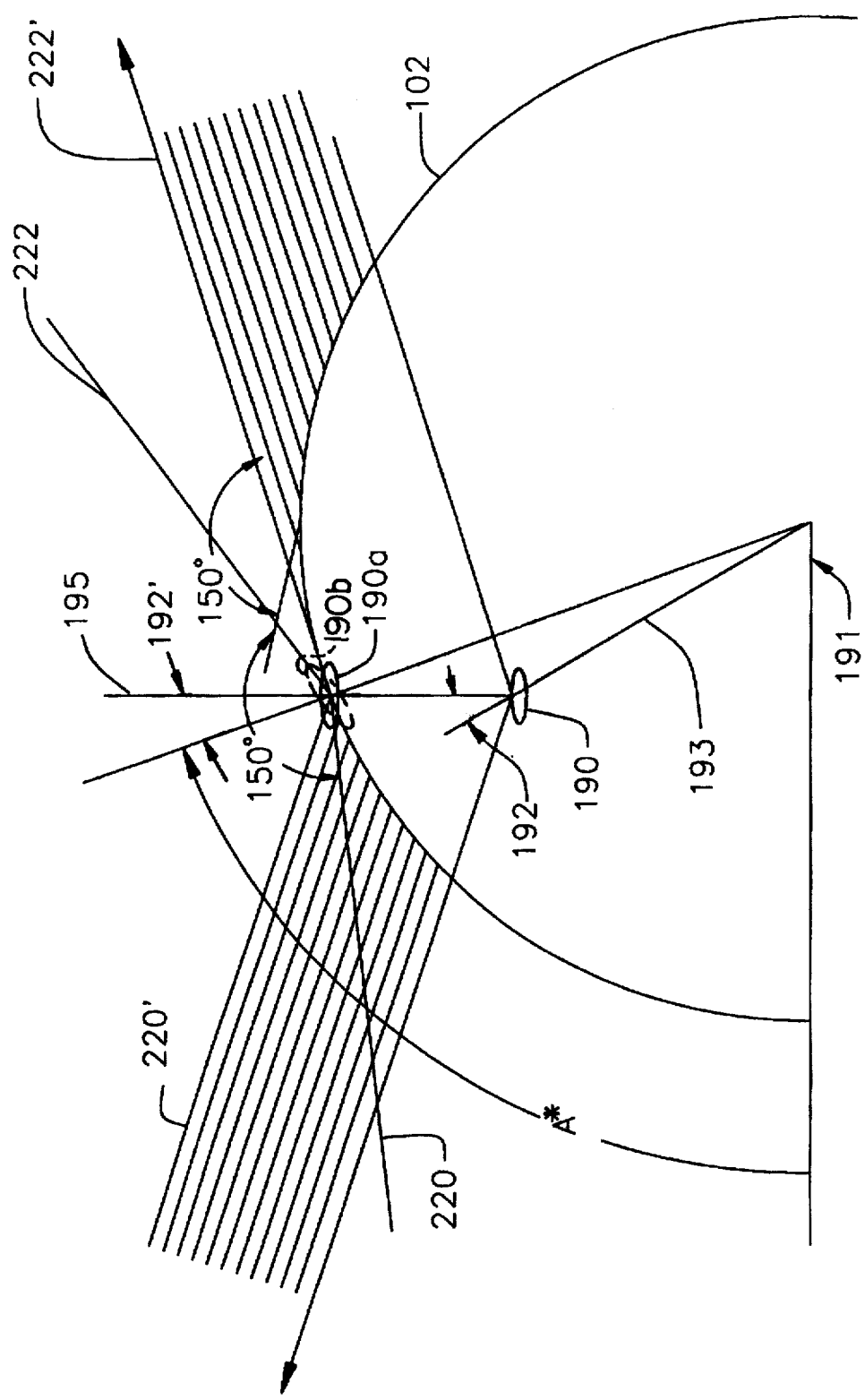
FIG. 13 is a view similar to FIG. 11 but depicting a different virtual viewpoint.

As seen in FIG. 13, a virtual view image can be formed for a completely arbitrary virtual viewpoint 190 inside discrete viewpoint locus 102 having any orientation and placement, i.e., any viewpoint location angle 191 and any skew angle 192, whether zero or non-zero. For a non-zero skew angle, the system first calculates the intercept of the virtual viewpoint centerline 195 on the discrete viewpoint locus 102. That intercept lies at a viewpoint location angle A* which is readily calculable from the geometry of the system. The radially directed (zero skew angle) viewpoint 190a at viewpoint location angle A* is used as a base view for synthesis of the virtual view at viewpoint 190. Where angle A* is exactly equal to the location angle of one of the original, discrete views 182, that view will serve as the base view. In the general case however, angle A* falls between the view point angles of two discrete views. In this situation, the base view is an interpolated view. Thus, within each lineset 188 of the epipolar image, the system forms an interpolated base viewpoint line 184s in the same manner as described above with reference to FIG. 6 and FIG. 9. Within each lineset 188, the system then forms a skewed viewpoint pixel line 210, representing a line from a virtual viewpoint 190b disposed on locus 102 at the same viewpoint location angle A, but having a skew angle 192' so that the center line of the view is directed along the same center line 195 as the desired virtual view.

Skewed viewpoint line 210 is formed in exactly the same way as the skewed viewpoint line 210 as discussed above with reference to FIG. 10, i.e., by starting at the Jth pixel of base viewpoint line 184$_s$ and mapping the pixels one for one into line 210 (FIG. 14) until reaching the end of line 184s, then mapping pixels one for one from the closest available lines 184 until a line of P pixels is produced. Here again, the mapping operation need not involve physical movement of the pixel data for the various pixels, but instead may incorporate mere modification of the addresses for data in a list of data included in the line. In effect, by the image skewing process, the system moves from an image having a field of view bounded by edge rays 220 and 222 to a new image having a field of view bounded by edge lines 220' and 222' (FIG. 13).

Figure 12:
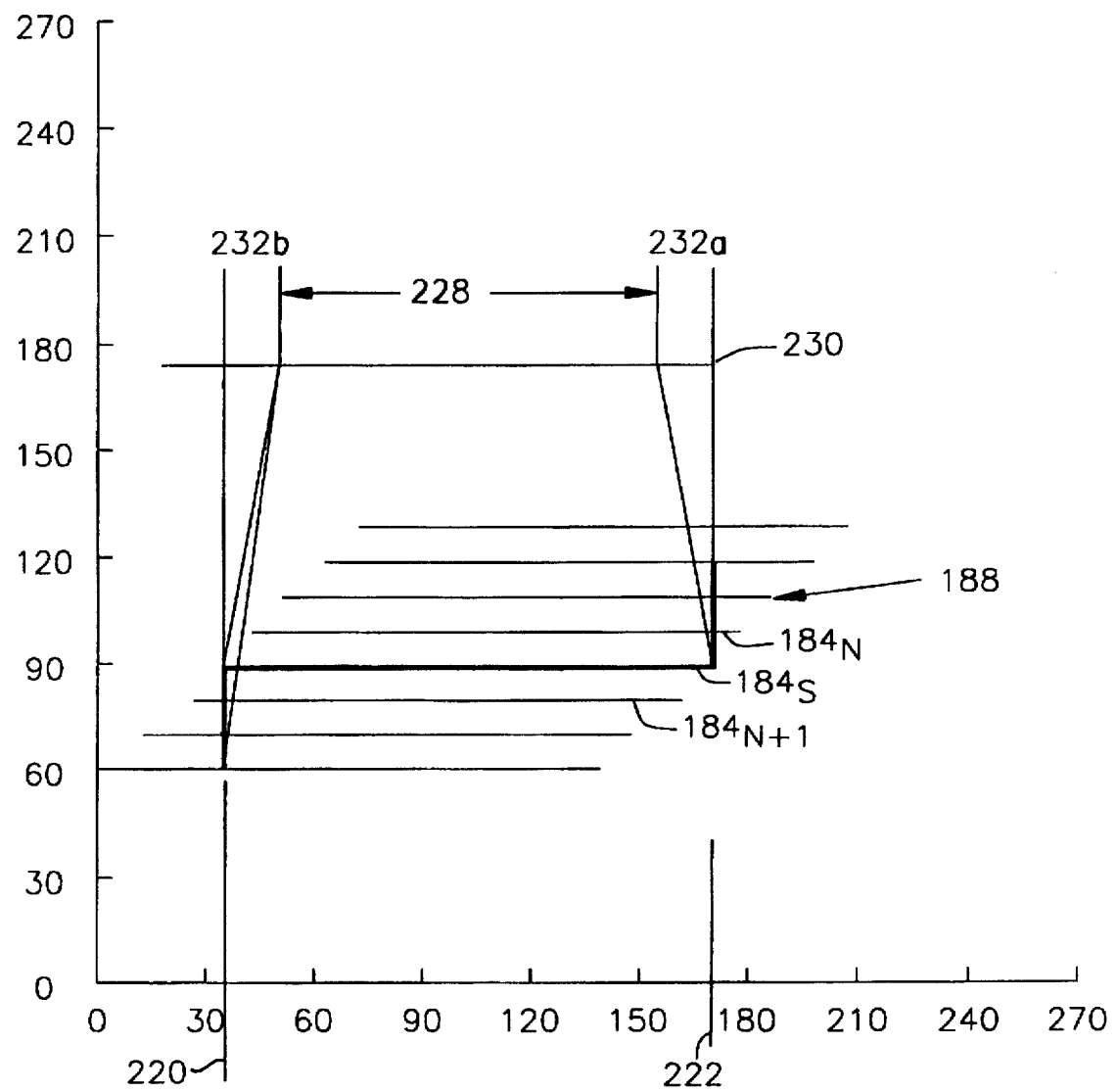
FIG. 12 is a further view similar to FIG. 10 but depicting the operations required for the virtual viewpoint of FIG. 11.
Figure 14:
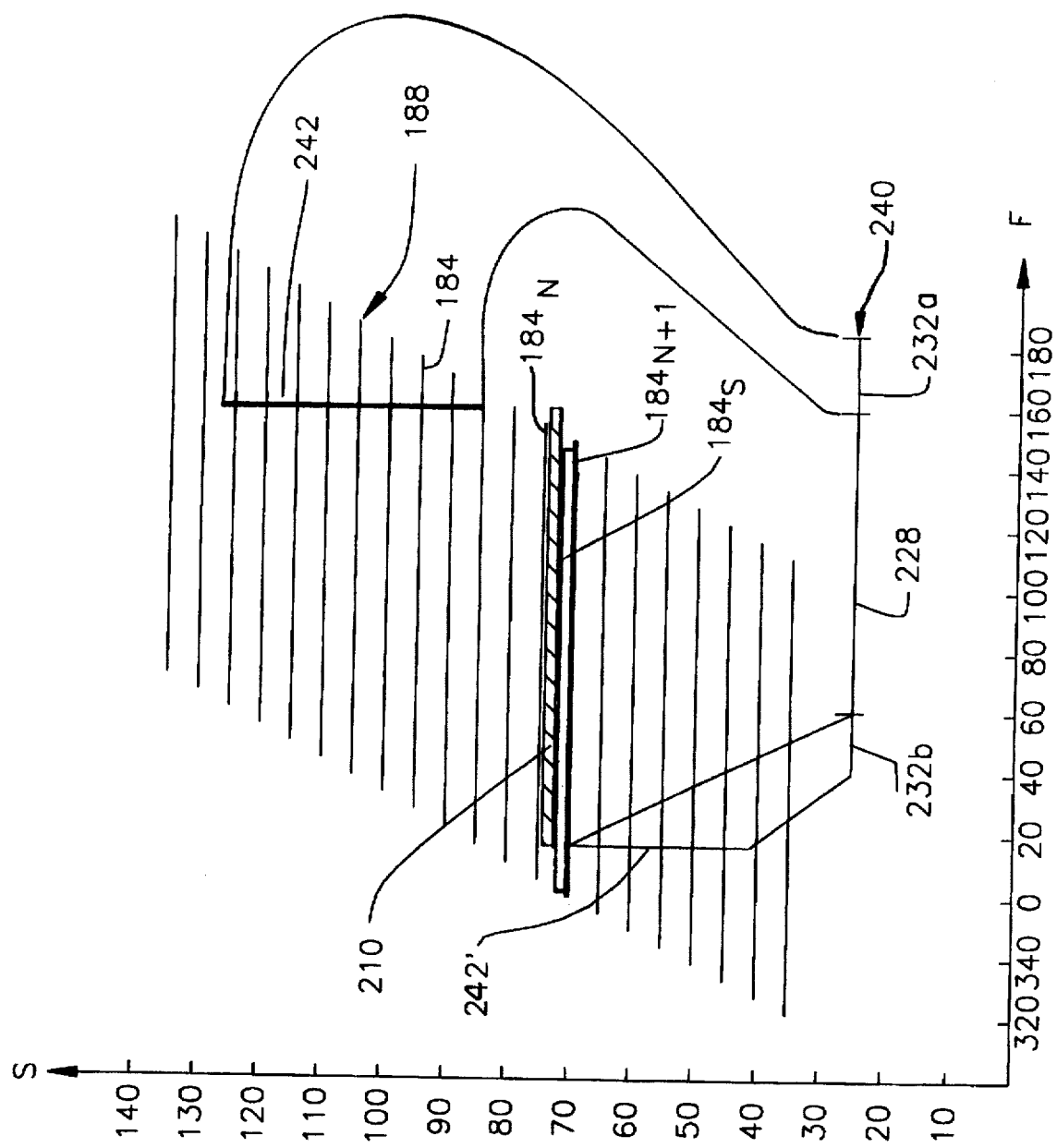
FIG. 14 is a view similar to FIG. 12 but depicting the operations required for the virtual viewpoint of FIG. 13.

In the next stage of the operation, the system maps the pixel data constituting the P pixels in skewed image line 210 into C pixels constituting a central region 228 (FIG. 14) on a composite line 240. This mapping procedure is performed in the same way as described above with reference to FIGS. 11 and 12. The system fills in the end zones 232a and 232b of composite line 240 by mapping pixels from other lines having the same ray azimuth angles as the end pixels of skewed image line 210. That is, the system selects pixels from other lines having the same ray azimuth as edge lines 220' and 222' of the skewed image. In the same manner as discussed above, the system starts at the right-hand end of line 210, as seen in FIG. 14, and selects supplementary pixels having the same azimuth angle, i.e., on a vertical line 242 extending upwardly from the end pixel of line 210. The same process at the opposite end of line 210 proceeds along a vertical line 242', i.e., at the same azimuth angle as the left end of skewed image line 210 and hence at the same azimuth angle as edge line 220'.

In this arrangement as well, the same mapping procedure is used for each lineset in the epipolar image 188. Thus, depending upon the position and orientation of each observer, the virtual viewpoint image 200 displayed to that observer may include pixel line 202 formed by any of the procedures discussed above. However, in each case, every pixel line 202 in the virtual viewpoint image will be formed by the same procedure. Different images are required for each of the different observer viewpoints as, for example, for the two displays 138 and 140 associated with observer 146, and for the two display 142 and 142 associated with the other observer 150. Image synthesis unit 134 forms all of these different images substantially simultaneously. The nature of the image-formation process lends itself to this simultaneous operation. All of the images are formed by operations performed on the same linesets. Ordinarily, the data in the original, discrete images used to form the virtual viewpoint images include progressively changing, full motion video data. An epipolar image formed from each such new set of frames or fields and new epipolar images are continually supplied to the virtual image synthesis unit 134. Thus, changes in the discrete images with time are reflected in the virtual viewpoint images formed by unit 134 so that the observer sees the scene in full motion video. Moreover, detection unit 156 and a synthesis 134 operate in real time with respect to the movements of the observer. Thus, as each observer moves, the virtual viewpoint images presented to his or her eyes change in essentially the same manner as they would if the observer were actually present and moving about within the real scene.

In a method according to a further embodiment of the invention, the system constructs each line of the virtual image for a virtual viewpoint 590 disposed at arbitrary radial distance 593 from the center of a circular locus in a viewpoint plane and at arbitrary virtual viewpoint location angle 591 from the index line 508 (FIG. 2) using a plurality of different base images on locus 502. For each line in the virtual image, the system treats the pixels of the line in many small sets, each such pixel set encompassing less than all of the pixels in the line. Pixels 510, 511 and 512 constitute one such set. As in the embodiments discussed above, the horizontal or first dimension location of each pixel corresponds to the angle B between the central axis 595 of the virtual image and a ray direction vector 561 extending from the pixel through the virtual viewpoint 590 to the object imaged by the particular pixel. Here again, there is an arbitrary skew angle or horizontal first dimension angle between the central axis 555 of the virtual image and the viewpoint location vector 593 from the center 504 of the locus. Accordingly, the difference between angle B and the skew angle represents a ray offset angle 596 between ray direction vector 561 and virtual viewpoint location vector 593. Stated another way, for a given virtual viewpoint location 590 and skew angle 595, the horizontal or first dimension location of a pixel specifies the ray azimuth Z or angle between the ray direction vector 561 and the index line 508.

The mutually adjacent pixels 510, 511 and 512 define ray direction vectors 561a, 561b and 561c at ray azimuth angles close to one another. The system selects a principal ray direction vector 563 extending from virtual viewpoint 590 and having azimuth close to the ray azimuths of the ray direction vectors 561a, 561b and 561c of the pixels constituting the set. In this instance, principal ray direction vector 563 is coincident with the ray direction vector 561b from the center pixel 511 of the set.

Figure 22:
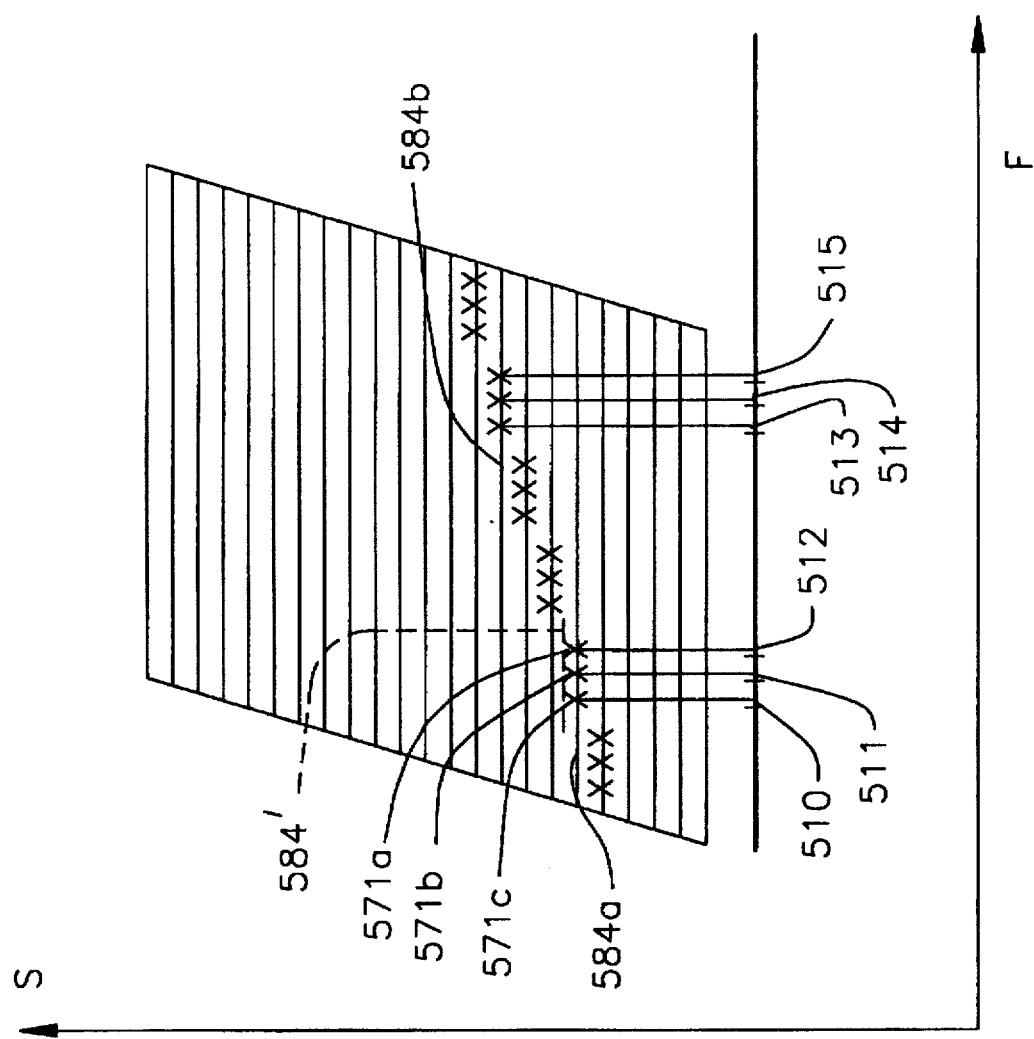
FIG. 22 is a view similar to FIG. 14 but depicting operations in accordance with another embodiment of the invention.

The system then computes the intercept of principal ray direction vector 563 on the discrete viewpoint locus 502 and selects a viewpoint on that locus having a view location 589a at or close to the intercept, i.e., the discrete view having viewpoint location closest to the intercept of vector 563 and the locus of 502, the system thus selects the corresponding line 584a in the lineset of the epipolar image (FIG. 22). If the intercept of the principal ray direction vector on the locus falls between two adjacent discrete view locations, then the system picks the discrete view location closest to the intercept. In an alternative version of this embodiment, the system can respond to an intercept falling between discrete view locations by preparing an interpolated line 584' in each lineset corresponding to a view location on the discrete view locus at the intercept.

Whether discrete line 584a or interpolated line 584' is used, in the next step of the method the system selects a pixel within the selected line having ray azimuth closest to the ray azimuth of each virtual pixel. Stated another way, the system selects the pixel in the selected line having first epipolar coordinate F closest to the ray azimuth of the individual pixel. For Example, pixel 571a has a ray direction vector at an azimuth close to the ray azimuth of virtual pixel 512 and hence pixel 571a of the discrete image is selected for pixel 512. Pixel 571b has a ray azimuth close to that of pixel 511 and so on. The data from each pixel in line 584a is mapped to the virtual view image line by copying such data to the corresponding pixel in the virtual view image line.

This process is repeated using additional pixel sets. A different discrete or interpolated image on locus 502 is selected for each pixel set. For example, the set of pixels 513, 514, 515 of the virtual view line has a principal ray direction vector 563' extending through the view location of discrete image 589b. Line 584b corresponding to image 589b is used as the source of pixel data copied to pixels 513, 514, 515. Other pixel sets take pixel data from other image and hence from other lines of the epipolar image lineset.

This approach may be implemented with larger pixel sets or, preferably, with smaller pixel sets. In a particularly preferred variant, each pixel set used in the process consists of only a single pixel, defining only a single ray direction vector. In this case, the principal ray direction vector is the ray direction vector of the single pixel. With a single-pixel set, the line of the epipolar image used to provide the pixel data may be a discrete-image line or an interpolated line, corresponding directly to the intercept of the ray direction vector of the pixel on the view locus 502. The pixel data is provided substantially without parallax error. The use of small pixel groups, such as the three-pixel groups illustrated in FIG. 22 and 22 approximates this zero-parallax condition.

The virtual view image line can be of essentially any length, corresponding to essentially any range of ray offset angles B and any field of view in the virtual image. In a further variant of this approach, the pixel data is not directly copied pixel-for-pixel from each selected line 584 (FIG. 22) into the virtual view image line. Rather, where the virtual view pixel has a ray azimuth or first-direction epipolar coordinate F falling between the ray azimuths of the adjacent pixels in a selected discrete line 584 or interpolated line 584', data from the two closest pixels can be combined and mapped onto one pixel. For example, in FIG. 22, virtual view image line pixel line 511 has a ray azimuth between those of pixels 571c and 571b on line 584a. The data from pixels 571b and 571c can be combined, as by a weighted average lending more weight to the pixel data in pixel 571b, closer to the desired ray azimuth and the combined data may be mapped into pixel 511. This arrangement provides even more exact pixel data for the pixels of the virtual view image line. As in the arrangements discussed above, lookup tables may be employed. That is, the system may store tables of data denoting the epipolar coordinates of a discrete or interpolated image to select for each combination of virtual view location and pixel location within the virtual view line.

Figure 24:
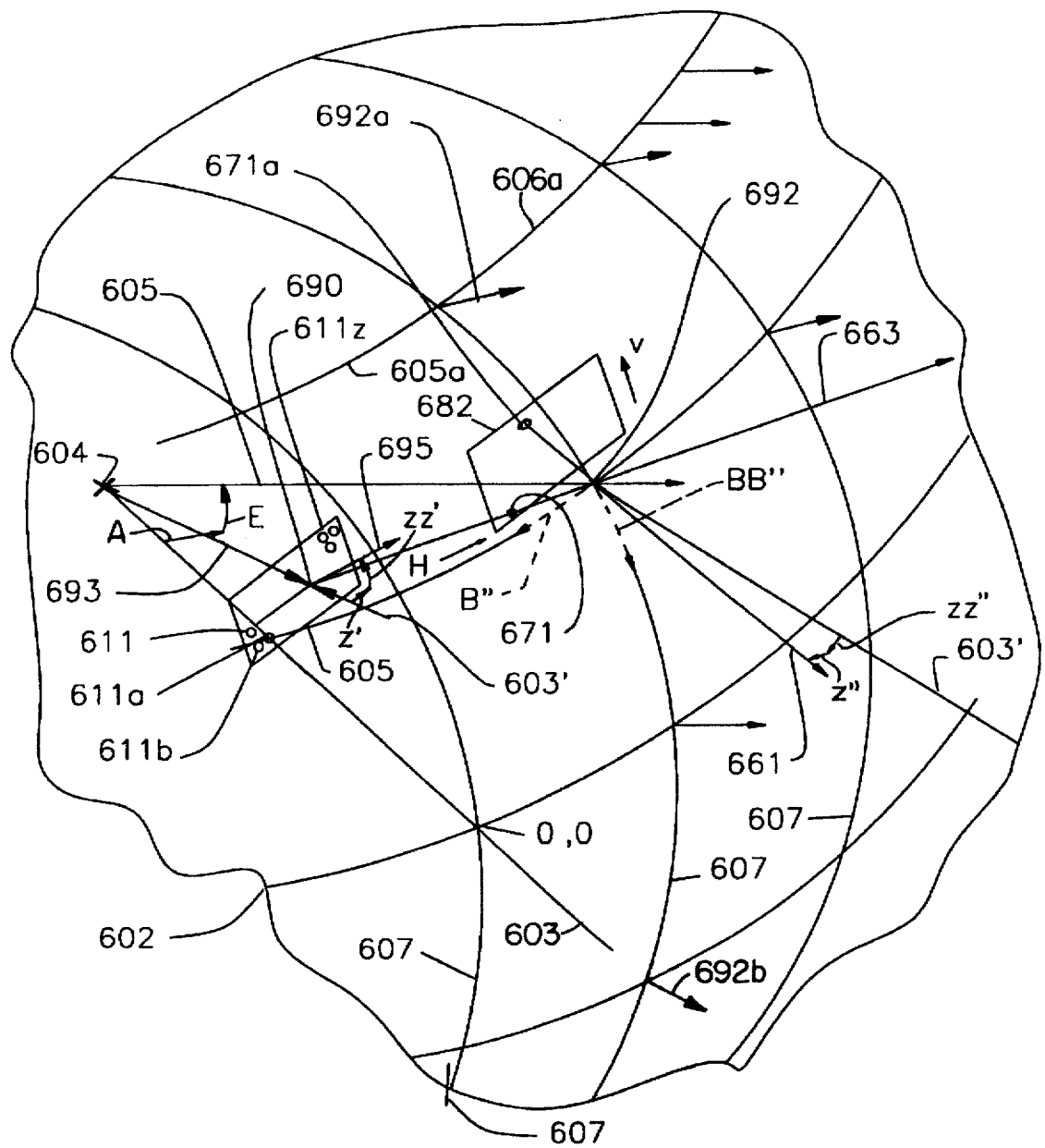
FIG. 24 is a diagrammatic perspective view of a viewpoint locus in accordance with yet another embodiment of the invention.

As illustrated in FIG. 24, a generally similar approach may be applied using a set of discrete images distributed in two orthogonal directions on a multi-dimensional image locus such as the surface 602 of a sphere or sector of a sphere having a center 604. In this embodiment, the location of a discrete view is specified by the azimuth angle A and elevation angle E of the viewpoint location vector 605 extending from center 604 to the viewpoint 692. The azimuth and elevation are specified with reference to an index line 603 passing through the surface at a location of zero azimuth and zero elevation. Each viewpoint has a central principal view direction vector coincident with the view location vector 605. That is, each view is directed substantially radially with respect to the spherical view locus.

The azimuth and elevation of the discrete views correspond to azimuth and elevation in the frame of reference of the scene. For example, where the discrete views are views captured by real cameras looking at a real scene, the camera which captures discrete view 692a would be disposed at a relatively high elevation and pointing upwardly in the scene, whereas the camera which captures discrete view 692b would be mounted at a lower elevation and pointing downwardly in the real scene. Here again, each view has first and second image dimensions, desirably vertical and horizontal dimensions V and H parallel to the elevation and azimuth directions respectively. Here again, the first horizontal image dimension H represents the difference in azimuth B" between (1) the ray direction vector 661 from the pixel 671 through discrete image location 692 and (2) the principal view direction vector which is coincident with the view location vector 605. Correspondingly, the location of the pixel 671 in the vertical image dimension V represents the difference BB" in elevation between the ray direction vector 661 and the viewing axis and view location vector 605. Thus, the vertical horizontal image dimensions of each pixel 671, the discrete image define the azimuth Z" and elevation ZZ" of the ray direction vector 661 relative to an index line 603' parallel to the index line.

A two-dimensional virtual viewpoint image for a virtual viewpoint 690 specified by a virtual viewpoint location vector 693 having radius different than the radius of the spherical surface 602 and at a arbitrary azimuth and elevation can be derived as a two-dimensional array of virtual image pixels 611. A set of mutually adjacent pixels 611a, 611b ... 611n is selected from within the array. Here again, each pixel defines a ray direction vector 695 from the virtual pixel through the virtual viewpoint 690. Each such ray direction vector defines a ray azimuth Z' relative to the index line 603 or relative to an index line 603' parallel to index line 603. Similarly, each ray direction vector defines an elevation angle ZZ' relative to the index line. The various pixels 611 within each small set of mutually adjacent pixels define a principal ray direction vector 663 which has similar azimuth and elevation. Here again, in the limiting case, each small group of adjacent pixels includes only one pixel 611 and the principal ray direction vector 663 is simply the ray direction vector 695 of that pixel.

For each set of virtual pixels, the intercept of the principal ray direction vector 663 on the discrete view locus 602 is determined, and the discrete image at viewpoint 692 closest to that intercept is selected. Within the selected discrete image, the system selects the pixel or pixels 671 having ray direction vectors 661 with azimuth and elevation closest to the azimuth and elevation of the ray direction vector 695 of the particular pixel. Data from that pixel is then copied directly into the pixel 611 of the virtual image. Different pixel sets defining different principal ray direction vectors 663 will take data from different discrete images 682. For example, the pixel set including virtual pixel 611z will define a principal ray direction vector passing through discrete viewpoint 692c.

Figure 25:
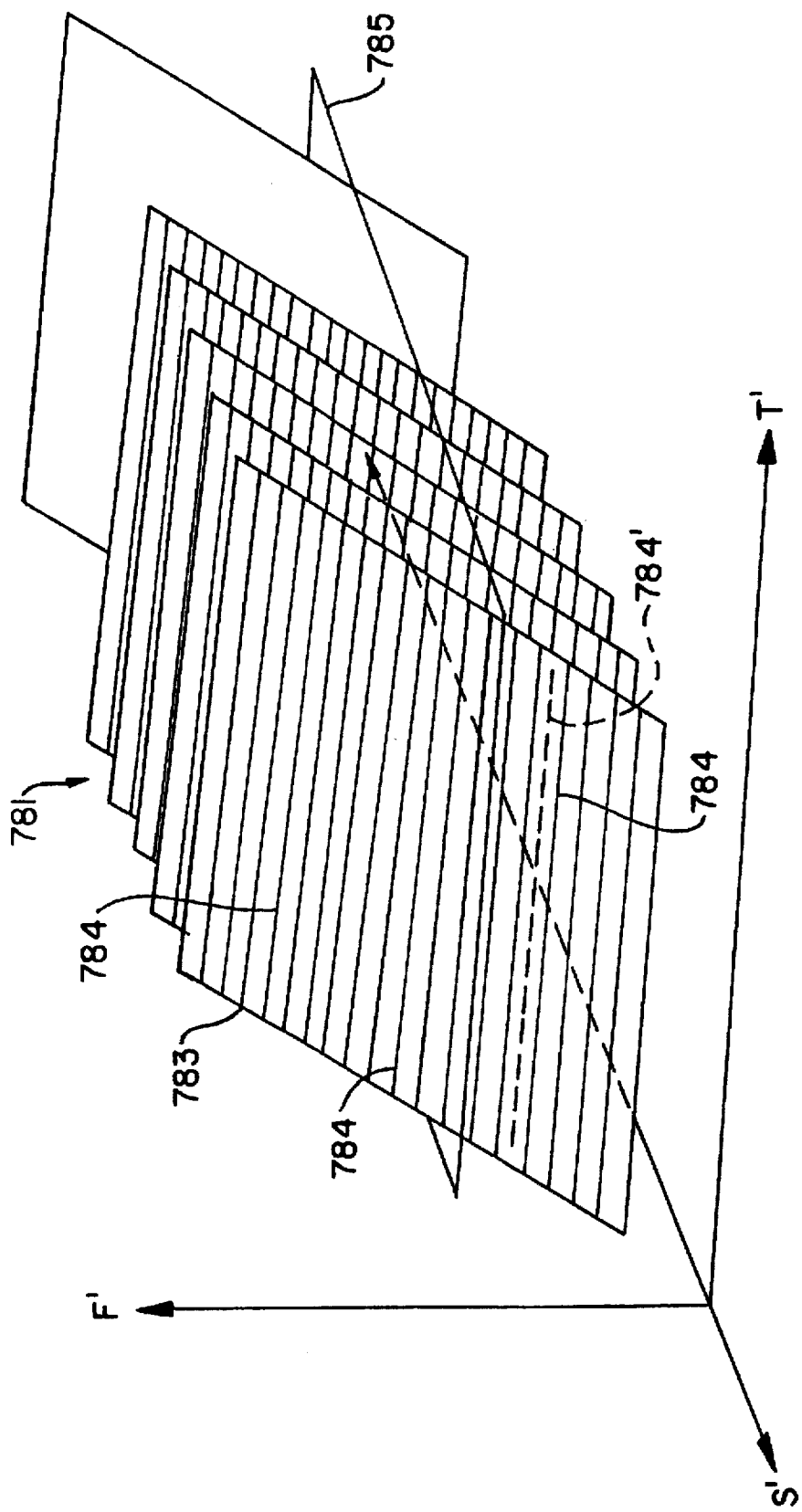
FIG. 25 is a diagrammatic view of a lineset associated with the viewpoint locus of FIG. 24.

The foregoing method permits construction of a virtual view image, but does not provide for interpolation between discrete images. That is, where a principal ray direction vector falls between discrete view locations 692, the system must accept the closest discrete view location. In an alternative method, using the same discrete view locations and geometry as depicted in FIG. 24, the data from the discrete images is converted into a three-dimensional epipolar or transform image including a plurality of line sets as illustrated in FIG. 25. Each such line set includes one line of pixel data 784 from each discrete image. Each such line in the entire line set has the same second or vertical image dimension coordinate V (FIG. 24). Each lineset has a first epipolar coordinate F' corresponding to azimuth of the discrete view and a second epipolar coordinate S' corresponding to elevation of the discrete view. Because all of the pixels in the line set have the same second image dimension or difference in elevation from the view location vector of the view itself, the second image dimension S' of each pixel also represents the elevation Z" of the ray direction vector from the pixel. That is, for every pixel in a given lineset, the elevation of the ray direction vector is equal to the elevation of the image location vector 605 plus a constant, this constant being different for different linesets but uniform throughout any given lineset. Each lineset also has a third epipolar coordinate corresponding to the azimuth Z" of the ray direction vector 661 of the particular pixels. Thus, each lineset as depicted in FIG. 25 includes lines from numerous discrete images. The lines from images on any circular locus 605 of constant elevation fall in a single plane 783 of the epipolar image having constant second epipolar coordinate whereas lines from images on the same line of longitude 607 or circular locus of constant azimuth fall in a plane 785 of constant first dimension F'. As in the epipolar images discussed above, the number of line sets in the epipolar image equals the number of horizontal lines wit-bin each discrete image. The line sets are formed by processes similar to those used in formation of the two-dimensional linesets discussed above.

The epipolar image is used to create a virtual view image by a process similar to that discussed above with reference to FIGS. 22 and 23. Thus, for each set of pixels 611 the system selects an image location on locus 602 close to the intercept of principal ray direction vector 663 on the locus. That is, the system provides a line of pixel 784 having first and second epipolar coordinates close to the intercept for use as a base line. Where the intercept does not coincide exactly with a discrete image location, the system can form an interpolated line 784' by interpolation between the pixel data in the for surrounding discrete image lines 784 at the same ray azimuth or third epipolar coordinate T. Here again, the pixel data from the selected line 784 or 784' of the epipolar image may be mapped into the pixels of the virtual view image line being synthesized by simple copying from one pixel of the selected line to the pixel having the closet azimuth in the virtual view image. Alternatively, a more complex mapping scheme involving interpolation between adjacent pixels can be employed.

Line sets involving three-dimensional epipolar images can be compressed, stored and combined by methods corresponding to handling of the two-dimensional epipolar line sets discussed above. For example, each plane 783 or 785 of such an epipolar line set can be handled or combined by the same methods as applied to the individual two-dimensional epipolar line sets described above.

In this regard, it should be noted that the image reproduction achieved by a system as discussed above normally is not perfect. For example, substitution of the supplementary pixels at the ends of the pixel lines necessarily introduces some parallax error. The substituted pixels have been taken from viewpoints differing from the base viewpoint. They may not have exactly the same information as a hypothetical pixel taken from the base viewpoint at the same ray azimuth. However, in normal operation these errors are relatively small and affect only the edges of the virtual viewpoint image. The center of the image, where the observer's vision is most acute, remains substantially unaffected. To suppress these errors still further, the system may be arranged to capture images having a field of view wider than the virtual viewpoint images to be displayed. Thus, as illustrated in FIG. 10, each line 184 may incorporate P pixels, representing the full field of view, whereas the image to be displayed may require only a smaller number of pixels indicated by image line 250, representing a smaller field of view. This leaves M' excess pixels at each end of the line 184. For a normal, unskewed image, line 250 contains the pixels from the central portion of line 184. However, for a skewed image, line 250 can be reconstituted to start closer to one end or the other end of line 184. In this instance, the pixels at the ends of the line are taken from the same line 184, i.e., from an image with the correct viewpoint. If the degree of skew exceeds that which can be accommodated by M' pixels, then supplementary pixels from adjacent lines are used.

Numerous variations and combinations of the features discussed above can be utilized. The interpolation scheme used to derive an interpolated line in the epipolar image (FIGS. 6 and 9) can differ from the pixel-by-pixel interpolation scheme described. Various schemes for detecting edges and boundaries of objects in video images are well-known in the processing of conventional, two-dimensional video images. Any of these schemes can be applied to each lineset of the epipolar image. For example, in FIG. 6 the edges of strip 110' can be detected directly. Once such edges have been detected, the same can be used to assign pixel values in the interpolated line; the pixel values can be calculated from the closest pixel values on the same side of the edge, while disregarding pixel values on the opposite side of the edge.

The systems described above can introduce certain occlusion and disocclusion errors. That is, where the virtual viewpoint image represents a substantial skewing or displacement of the base image, the virtual viewpoint image may not accurately reflect occlusions of distant objects by close objects. This problem is substantially minimized by using a base image reasonably close to the virtual viewpoint image as discussed above. Provided that the locus of the observer is reasonably close to the locus of the discrete images, the system does not introduce close occlusion errors.

Figure 15:
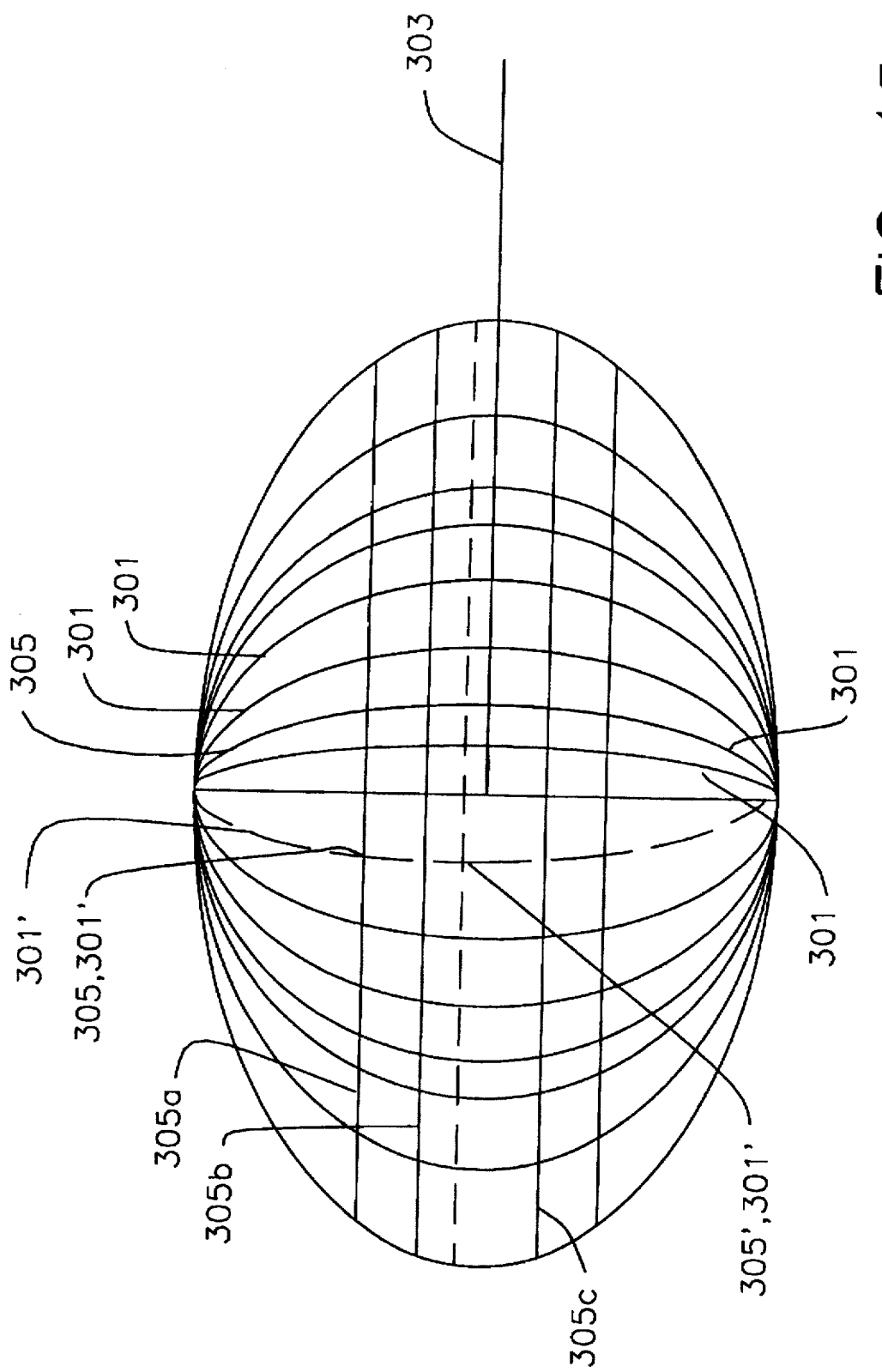
FIG. 15 is a diagrammatic view depicting a further embodiment of the system.

The system discussed above with reference to FIGS. 1–14 utilizes a planar, circular, discrete viewpoint locus. It assumes that the observer is looking in a single horizontal plane. It does not provide corrections for tilt of the observer's head. However, the invention is not limited in this manner. In a further extension of the system, the discrete images can be provided as a spherical image array as discussed above with reference to FIGS. 24 and 25 or as illustrated in FIG. 15. In that system, the discrete images may be taken as radial images at intersections of meridians 301 and latitude lines 305 of a sphere. The discrete images taken on any latitude line 305 of the sphere can be treated in substantially the same way as the images on the circular locus discussed above. Thus, the system can derive a virtual image representing the image at latitude line 305 and on an arbitrary longitude line 301' intermediate between the longitude line 301 of the discrete images using substantially the same methods as described above. In the same manner, the system can derive virtual images for numerous locations along longitude line 301' by independently treating the data for the images on the various latitude lines as, for example, the various discrete images on line 305*a* at its intersection with line 301 and the discrete images on line 305*c* at its intersection with the various latitude lines 301. Thus, the system derives a set of virtual images which can be treated as a set of discrete images at various locations on the virtual meridian 301'. The system can then process these images to derive a virtual viewpoint image at any arbitrary location 305', 301' or 301' in the same manner as the system described above derive images on the circular locus. Likewise, the system can derive a virtual viewpoint image for any arbitrary point within the spherical locus, on the plane of virtual meridian 301' in the same manner as the system described above derives virtual viewpoint images for arbitrary locations within the circular locus.

In all of the systems discussed above, the camera locus is curvilinear, the discrete images represent viewpoints looking outwardly from within the locus and the virtual viewpoints are inside of the locus. However, the virtual viewpoints may be disposed outside of the camera locus. For example, the system discussed above can accommodate a virtual viewpoint location outside of the locus, with the view axis pointing outwardly, away from the locus. In this case, the base view would be taken as the view immediately behind the outwardly looking virtual viewpoint, and would be modified to map less than all of the pixels in the base view line of the epipolar lineset into the entire virtual image line. However, where the virtual viewpoints are far from the discrete viewpoint locus, and where the same are substantially skewed, the virtual viewpoints can require information which is simply not present in the discrete images and therefore not present in the epipolar image lines. For example, a viewpoint for outside of the image locus, with the viewer looking inwardly toward the locus, will require information as to the color and brightness of the back sides of objects which have their front sides facing towards the locus.

In the systems described above, the virtual image synthesis apparatus determines the required mapping by calculations performed in real time as the observer's position changes. However, operation of the system can be considerably expedited by providing a look-up table listing the pixel mappings to be performed for each position of the observer. Moreover, in the systems discussed above, the virtual image synthesis unit derives the two virtual images for each observer independently. However, because the observer's interpupillary distance is fixed, there is a fixed relationship between the two points of view of the observer. Stated another way, the view point of the virtual image to be presented through one display unit 140 of a given observer bears a fixed relationship to the viewpoint of the image to be presented through the other display unit 138 for the same observer. Thus, the pixel mappings required to form the image for display 140 will bear a determinable relationship to the pixel mappings required for the display unit 138.

Various techniques can be employed to reduce the processing load involved in generating the images. First, where the scene to be portrayed includes static elements, the static and moving elements can be segregated. For example, the contents of one frame can be subtracted from the contents of the next succeeding frame to form image including only the changed portions. The static elements can be segregated from the moving elements by well-known image processing techniques. An epipolar image including all of the static elements can be captured once. Separate epipolar images consisting only of the moving elements can be constructed from the images by the real cameras. Each lineset of the epipolar image of the moving objects can be overlaid onto the corresponding lineset in the image of the static objects. The linesets can be overlaid by determining the slope of each strip in the lineset to detect distance from the camera. Where both linesets include data, the pixels representing the closer object, whether moving or still, are included in the final composite lineset. Alternatively, the static environment can be captured in one lineset whereas a real moving object as, for example, an actor in a scene, can be captured in other epipolar images including real pixel data only for the desired object and a artificial information, such as a deep blue background color, for the remainder of the pixels. The epipolar image including the changing data can be merged with the epipolar image representing the static background by the conventional technique of "chroma keying". In this technique, each lineset of the background image is combined with the corresponding lineset of or changing by checking the chroma or color reflected in the pixel data of the changing image. Wherever the chroma indicates the artificial background color such as dark blue, the second image is disregarded and the pixel data is taken entirely from the first image. Conversely, wherever the second image includes pixel data indicating a different color, the pixel data is taken entirely from the second image. This technique is applied routinely in processing of ordinary video images, and can be applied to the epipolar image linesets in the same manner.

Although the foregoing discussion has centered on images of real scenes captured by real cameras, the same techniques can be applied to mathematically generated images. For example, a computer can be actuated to generate the various discrete images of a mathematically constructed scene, and the resulting pixel data can be processed in exactly the same way as the real image pixel data discussed above. Also, an epipolar image representing a real scene can be merged with an epipolar image representing a computer generated object or objects.

EXAMPLE 1

Figure 16:
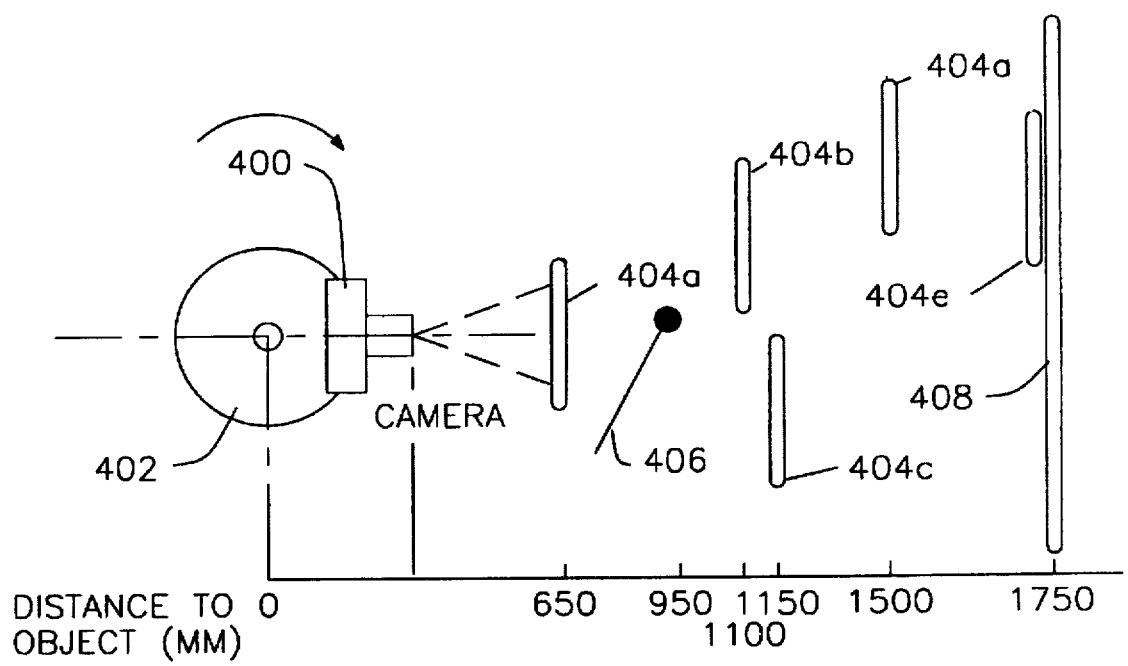
FIG. 16 is a diagrammatic top view depicting certain structures utilized in a practical test of certain aspects of the invention.
Figure 17A:
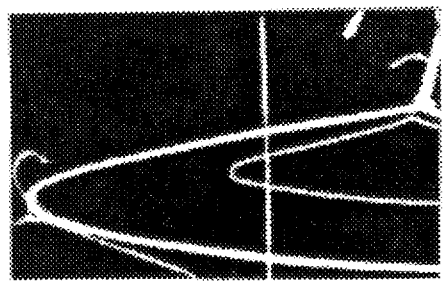
FIGS. 17a, 17b and 17c are actual photographic images as initially captured with the equipment of FIG. 14.
Figure 17B:
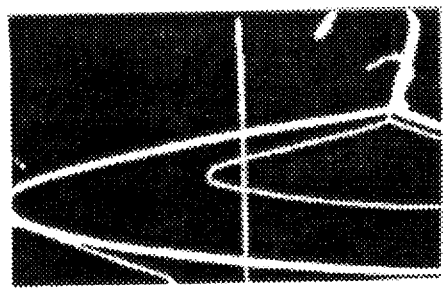
Figure 17C:
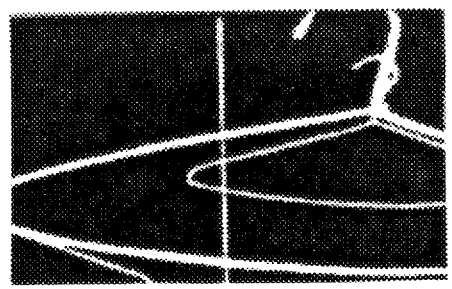

Certain aspects of the present invention are illustrated by the following non-limiting example. As illustrated in FIG. 16, a video camera 400 is positioned on a turntable 402 so that the camera points radially outwardly from the center of the turntable and so that the lens of the camera lies at a radius of 250 mm from the turntable center. The camera and turntable are positioned on a flat horizontal surface. Several ordinary coat hangers 404 are arranged vertically above the surface. A string 406 extends vertically. All of these elements are positioned in front of a dark, vertical backdrop 408 at a distance of 1750 mm from the turntable center. The distance to each object from the turntable center is indicated by the scale at the bottom 20 in FIG. 16. Camera 400 has a field view of 27 degrees from edge-to-edge, or 13.5 degrees on either side of the view center line. The turntable is actuated to turn in one degree steps. At each step of the turntable, while the turntable is stopped, camera 400 captures a video image. The camera thus captures discrete images at 1 degree increment. FIG. 17a is the 31st discrete image; FIG. 17b is the 32nd discrete image and FIG. 17c is the 33rd discrete image. The effect of camera rotation and parallax can be seen in these images. See, for example, the image of hanger 404b [?] disappearing from the left-hand edge in FIGS. 17b and 17c, and the change in the apparent relative position between the two hangers at the top of the image.

Figure 18:
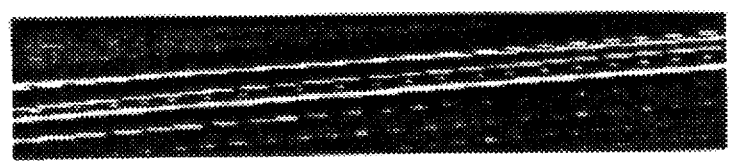
FIG. 18 is a depiction of lineset generated from the images captured by the apparatus of FIG. 14.
Figure 19:
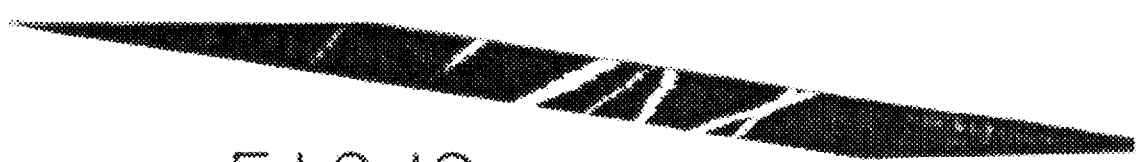
FIG. 19 depicts of the lineset of FIG. 18 after modification.

FIG. 18 illustrates one lineset from an initial epipolar image reconstituted from the images captured by the camera. FIG. 19 shows the same lineset after application of an offset as discussed above with reference to FIG. 6.

Figure 20:
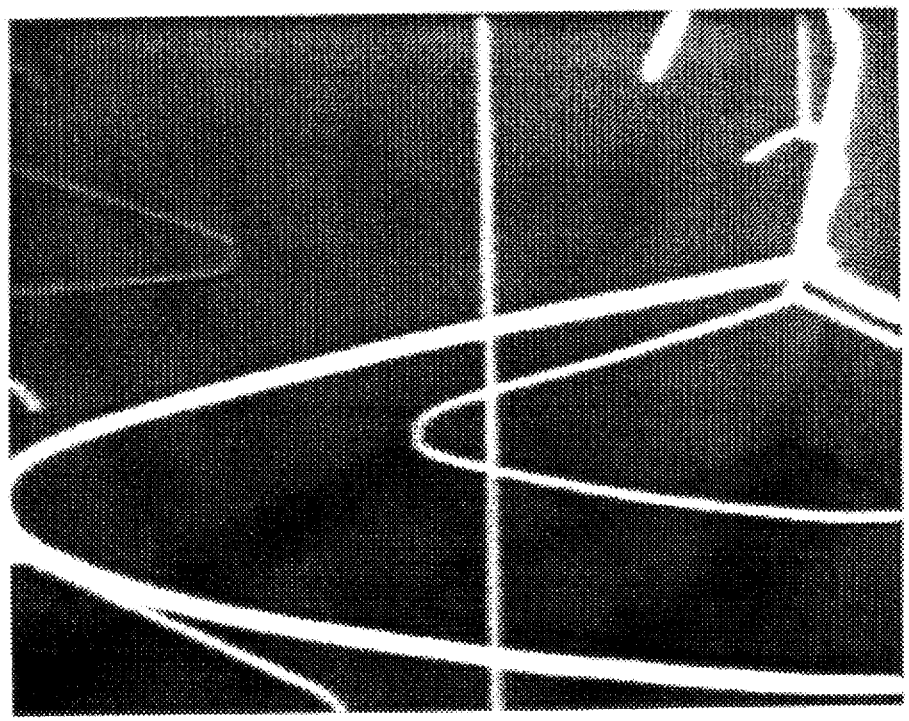
FIG. 20 is an actual image captured at one position of the apparatus of FIG. 14.
Figure 21:
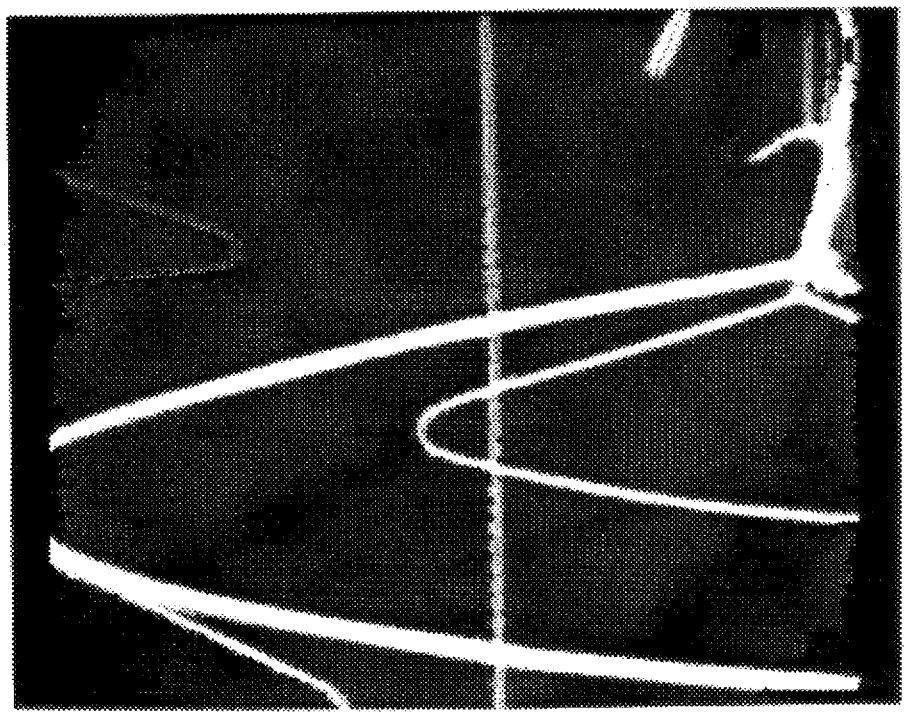
FIG. 21 is a synthesized image, derived from other images captured by the same apparatus, to depict the image which would be captured from the same viewpoint as FIG. 20.

FIG. 20 is an enlarged version of the 32nd image as captured and as also illustrate in FIG. 17b FIG. 21 shows a virtual image generated by interpolation between the discrete images of FIGS. 17a and 17c. That is, each line in the image of FIG. 21 was derived by interpolation in a lineset from the epipolar image, as if the discrete 32nd image did not exist. The image is truncated at its edges. Nonetheless, it is apparent from comparison of FIGS. 20 and 21 that the scene has been portrayed with good accuracy in the virtual image.

As these and other variations and combinations of the features discussed above can be utilized with departing from the present invention, the foregoing description of the preferred embodiment should be taken by way of illustration rather than by way of limitation of the invention as defined by the claims.

What is claimed is:

1. A method of synthesizing an image of a scene corresponding to the image of said scene which would be observed from a virtual viewpoint comprising the steps of:
   (a) providing a plurality of discrete images corresponding to the images of the scene observed from a plurality of discrete viewpoints, each said discrete image including an array of pixel data in a first image dimension corresponding to position of depicted objects in a first dimension of said scene and in a second image dimension orthogonal thereto;
   (b) constructing a first epipolar image from said discrete images, said first epipolar image including a plurality of line sets, each one of said line sets including one line of pixel data in said first image dimension from each one of said discrete images, all of the lines in each one of said line sets corresponding to the same location in said second image dimension, said lines of pixel data within each line set being ordered in an order corresponding to an order of positions of said discrete viewpoints in said first dimension of said scene, each pair of adjacent lines of pixel data within each line set being offset from one another by an initial offset;
   (c) providing pixel data for said synthetic image as a plurality of virtual viewpoint pixel lines extending in said first image dimension and displaced from one another in said second image dimension by (i) associating each virtual viewpoint line with a line set in said first epipolar image formed from lines having location in said second image dimension corresponding to the location in said second image dimension of that virtual viewpoint line and (ii) for each pixel within each virtual viewpoint line, deriving synthetic pixel data from pixel data in the associated line set.

2. A method as claimed in claim 1 wherein said step of deriving synthetic pixel data includes the steps of selecting a plurality of lines within the associated line set corresponding to discrete viewpoints in the vicinity of said virtual viewpoint and deriving the synthetic pixel data from the pixel data in the so-selected lines.

3. A method as claimed in claim 2 wherein said step of deriving synthetic pixel data for each synthetic pixel includes the step of choosing a plurality of pixels in the selected lines adjacent to the position Of the synthetic pixel in said first dimension and deriving the synthetic pixel data from the pixel data in said chosen pixels of said selected lines.

4. A method as claimed in claim 3 wherein said selected lines in the line set include lines corresponding to discrete viewpoints bracketing the virtual viewpoint.

5. A method as claimed in claim 4 wherein said step of deriving pixel data for each synthetic pixel includes the step of interpolating the pixel data of the chosen pixels in said selected lines.

6. A method as claimed in claim 1 wherein said initial offset corresponds to the theoretical offset between pixels in adjacent lines of the line set representing a feature in said scene positioned at infinite distance from said viewpoints.

7. A method as claimed in claim 1 wherein, for each pixel in each virtual viewpoint line of the synthetic image, said step of deriving synthetic pixel data from the pixel data in other pixels of the associated line set includes the steps of:
   (a) processing the pixel data in the line set associated with that virtual viewpoint line to
      (i) select regions of the line set having different pixel data so that different regions represent different objects and
      (ii) derive boundaries for each such region, each such boundary defining a curve on the line set;
   (b) assigning each synthetic pixel to an object based upon the location of such pixel relative to said boundaries within said line set; and
   (c) calculating the pixel data for each synthetic pixel from pixel data in said line set representing the same object.

8. A method of synthesizing an image of a scene corresponding to the image of said scene which would be observed from a virtual viewpoint location and viewing direction and having a predetermined field of view, the method comprising the steps of:
   (a) providing a plurality of discrete images corresponding to the images of the scene observed from a plurality of discrete viewing directions from a plurality of discrete viewpoints on a predetermined viewpoint locus, said viewing directions being disposed at different angles relative to a reference line in a first dimension of said scene, each one of said discrete images including an array of pixel data in a first image dimension and in a second image dimension orthogonal thereto, so that position of each pixel in said first image dimension within each image will represent an angle between the viewing direction of the image and a ray direction from said pixel through the viewpoint of the image to a point in the scene represented by that pixel;
   (b) constructing a first epipolar image from said discrete images, said first epipolar image including a plurality of line sets, each said line set including one line of pixel data in said first image dimension from each said discrete image, all of the lines in each said line set corresponding to the same location in said second image dimension, said lines of pixel data within each line set being ordered in an order corresponding to the order of said viewing directions in said first dimension of said scene, whereby each said line set defines an epipolar plane having first and second epipolar coordinates, each pixel in each line set having a location in said first epipolar coordinate and a location in said second epipolar coordinate, the location of each pixel in said second epipolar coordinate representing the viewing direction of the discrete image from which the line of pixel data incorporating that pixel was taken, the location of each pixel in said first epipolar coordinate representing a ray azimuth angle, the ray azimuth angle of each pixel being an angle in said first dimension of said scene between an index line and the ray direction of that pixel;
   (c) selecting a base viewpoint on said viewpoint locus and a viewing direction associated with the base viewpoint, and;
   (d) forming a line of the virtual viewpoint image from each said line set by:
      (i) providing a base line within the line set having a second epipolar coordinate representing a viewing direction equal to the viewing direction associated with the base viewpoint;
      (ii) mapping pixel data from the base line into the virtual viewpoint image line;
      (iii) selecting supplementary pixels from one or more additional lines of the line set, said supplementary pixels having locations in said first and second epipolar coordinates close to the location of an end of the base line in said epipolar coordinates and
      (iv) incorporating data from said supplementary pixels at an end of the virtual viewpoint image line corresponding to such end of the base line, steps (iii) and (iv) being performed at one end of the base line or at both ends of the base line so that the virtual viewpoint image line includes pixel data for said predetermined field of view.

9. A method as claimed in claim 8 wherein said viewpoint locus is curvilinear, said discrete viewing directions pointing across said locus from a camera side towards an object side thereof.

10. A method as claimed in claim 9 wherein the viewing direction for each said discrete viewpoint is substantially orthogonal with respect to said locus.

11. A method as claimed in claim 9 wherein said camera side is the interior of the locus, adjacent the center of curvature thereof, and said viewing directions for said discrete viewpoints point outwardly, away from the center of curvature.

12. A method as claimed in claim 11 wherein said virtual viewpoint is recessed inwardly toward the center of curvature of the locus, said step of selecting supplementary pixels being performed so that at least some of the supplementary pixels have first epipolar coordinates substantially equal to the first epipolar coordinate of an end pixel at an end of the base line.

13. A method as claimed in claim 12 wherein said step of mapping said pixels from said base line to said virtual viewpoint line includes the step of compressing the pixel data in said base line into a smaller number of pixels and mapping said smaller number of pixels onto only a portion of said virtual viewpoint line.

14. A method as claimed in claim 11 wherein said virtual viewpoint has a viewing direction skewed from the base viewing direction, said step of selecting supplementary pixels so that the ray azimuths of the supplementary pixels added at an end of the base line vary progressively in the direction of skew.

15. A method as claimed in claim 11 wherein said step of selecting supplementary pixels is performed by (i) selecting a location in said first epipolar coordinate close to the location of an end of said base line to thereby select a ray azimuth angle;

(ii) examining lines in the line set and selecting as an additional line a line of the line set which
  (a) has a pixel with a location in said first epipolar coordinate equal to the selected location in step (i) and
  (b) has a location in said second epipolar coordinate at least as close to the location of said base line in said second epipolar coordinate as any other line in said line set which has pixels at the location selected in step (i);

(iii) selecting the pixel of the additional line selected in step (ii) having said location selected in step (i) as an additional pixel; and (iv) relating steps (i)–(iii) until all of said supplementary pixels have been selected.

16. A method as claimed in claim 8 further comprising the step of providing a lookup table setting forth a plurality of viewpoints and viewing directions and pixel location data specifying supplementary pixels for each such viewpoint and viewing direction, said step of selecting said supplementary pixels including the steps of retrieving the pixel virtual viewpoint and virtual viewing direction from said lookup table and selecting the supplementary pixels in accordance with said location data.

17. A method as claimed in claim 16 wherein said step of retrieving location data includes the step of interpolating between location data for adjacent viewpoints and viewing directions.

18. A method as claimed in claim 8 wherein said base viewpoint is located between two of said discrete viewpoints and wherein said step of providing said base line in each said line set includes the step of deriving pixel data for pixels constituting said base line from pixel data in lines of said line set corresponding to discrete viewpoints in the vicinity of said base viewpoint.

19. A method of synthesizing an image of a scene corresponding to the image of said scene which would be observed from a virtual viewpoint location and viewing direction, the method comprising the steps of:

(a) providing a plurality of discrete images corresponding to the images of the scene observed from a plurality of discrete viewing directions from a plurality of discrete viewpoint locations on a predetermined viewpoint locus, said viewing directions being disposed at different angles relative to an index line in a first dimension of said scene, each said discrete image including an array of pixel data in a first image dimension and in a second image dimension orthogonal thereto, so that position of each pixel in said first image dimension within each image represents an angle between the viewing direction of the image and a ray direction for that pixel, the ray direction for each pixel being the direction of a ray from that pixel through the viewpoint of the image to a point in the scene represented by that pixel;

(b) constructing a first epipolar image from said discrete images, said first epipolar image including a plurality of line sets, each said line set including one line of pixel data in said first image dimension from each said discrete image, all of the lines in each said line set corresponding to the same location in said second image dimension, said lines of pixel data within each line set being ordered in an order corresponding to the order of said viewing directions, whereby each said line set defines an epipolar plane having first and second epipolar coordinates, each pixel in a line set having a location in the first and second epipolar coordinates of the epipolar plane defined by such line set, the location of each pixel in the second epipolar coordinate representing the viewing direction of the discrete image from which the line of pixel data incorporating that pixel was taken, the location of each pixel in said first epipolar coordinate representing a ray azimuth angle of that pixel, the ray azimuth angle of each pixel being an angle in said first dimension between said index line and the ray direction of that pixel;

(c) forming a line of the virtual viewpoint image from each said line set, each such line including a plurality of pixels each such pixel in the virtual viewpoint image having a view azimuth angle, the view azimuth angle of each such pixel being the angle between said index line and the direction of a ray from that pixel through the virtual viewpoint to a point in the scene represented by that pixel, the process of forming each such line in the virtual viewpoint image being performed by selecting a plurality of pixel sets in the virtual viewpoint line, each such pixel set including one pixel or a plurality of mutually adjacent pixels, each such pixel set defining a principal ray line extending through the virtual viewpoint location at a principal view azimuth angle close to the view azimuth angles of the pixels in such pixel set and, for each said pixel set:

(i) selecting one of said viewpoints on said locus as a base viewpoint such that an intercept of the principal ray line on the viewpoint locus is adjacent the base viewpoint and selecting a discrete image at the base viewpoint as a base image;

(ii) selecting a base line within the line set which has a location in the second epipolar coordinate equal to the location representing the viewing direction of the base image; and (iii) for each pixel in the set, selecting one or more pixels of the base line selected in step (ii) having locations in the first epipolar coordinate close to a location representing a ray azimuth angle equal to the view azimuth angle of the pixel in the set; and mapping pixel data of the selected pixels of the base line into such pixel of the set.

20. A method as claimed in claim 19 wherein each said pixel set includes only one pixel of the virtual viewpoint image line, and wherein the principal view azimuth of each set is the view azimuth of the pixel constituting such set.

21. A method as claimed in claim 19 further comprising the step of providing a lookup table setting forth a plurality of virtual viewpoint location and view azimuths, and location data specifying one or more pixels within a base line for each such virtual viewpoint location and view azimuth, said step of selecting said base line and said pixels in said base line for each pixel set including the steps of selecting the pixels in accordance with said location data for the virtual viewpoint and view azimuth of each pixel.

22. A method as claimed in claim 19 wherein said viewpoint locus is curvilinear, said discrete viewing directions pointing across said locus from a camera side towards an object side thereof.

23. A method as claimed in claim 22 wherein the view direction for each said discrete viewpoint is substantially orthogonal to said locus.

24. A method as claimed in claim 22 wherein said camera side is the interior of the locus, adjacent the center of curvature thereof, and said viewing directions for said discrete viewpoints point outwardly, away from the center of the curvature.

25. A method as claimed in claim 19 further comprising the step of providing a lookup table setting forth a plurality of viewpoint location and principal view directions and base view location data specifying base views for each such virtual viewpoint location and principal view direction, said step of selecting said base view for each pixel set including the step of selecting the base view from said lookup table in accordance with said base view location data.

26. A method as claimed in claim 19 wherein said base viewpoint for at least some pixel sets is located between two of said discrete viewpoints and wherein, for each said base viewpoint, said step of providing said base line in each said line set includes the step of deriving pixel data for pixels constituting such base line from pixel data in lines of said line set corresponding to discrete viewpoints in the vicinity of said base viewpoint.

27. A method as claimed in claim 19 wherein said step of providing said base line for each pixel set includes selecting the line in the associated line set corresponding to the discrete viewpoint closest to the intercept of the principal ray line on the viewpoint locus and providing the so-selected line as pixel data of the base line.

28. A method of synthesizing an image of a scene corresponding to the image of said scene which would be observed from a virtual viewpoint location and virtual viewing direction, the method comprising the steps of:

(a) providing a plurality of discrete images corresponding to the images of the scene observed from a plurality of discrete view directions from a plurality of discrete viewpoint locations on a viewpoint locus having orthogonal first and second dimensions, each said discrete view direction defining a view direction vector, each said discrete image including pixel data for pixels in an array extending in a first image dimension and in a second image dimension orthogonal thereto, whereby position of each pixel within each image will represent differences in azimuth angle and elevation angle between the view direction vector of the discrete image and a ray direction vector from said pixel through the discrete viewpoint to a point in the scene represented by that pixel, the azimuth angle of a vector being the angle in said time dimension of said locus between such vector and an index line, the elevation angle of a vector being the angle in said second dimension of the locus between such vector and said index line;

(b) forming a two-dimensional array of virtual pixels constituting the synthetic image so that position of each virtual pixel in the array represents differences in azimuth and elevation angles between (i) a virtual ray direction vector from that virtual pixel through the virtual viewpoint to the point in the scene represented by that virtual pixel and (ii) a virtual view direction vector through the virtual viewpoint representing the virtual viewing direction;

(c) selecting a plurality of virtual pixel sets in the virtual array, each such virtual pixel set including one virtual pixel or a plurality of mutually adjacent virtual pixels, each said virtual pixel set defining a principal ray vector extending through the virtual viewpoint location in a principal view direction close to the virtual ray vector directions of the pixels in such pixel set and, for each said virtual pixel set:

(i) determining an intercept of the principal ray vector of that virtual pixel set on the viewpoint locus;

(ii) selecting one of said discrete images having a viewpoint location on said locus close to the intercept selected in step (i) as a base image for the virtual pixel set; and (iii) for each virtual pixel in the set, selecting one or more pixels of the base image selected in step (ii) having ray direction vectors with azimuth and elevation angles close to the azimuth and elevation angles of the virtual ray direction vector for that virtual pixel and mapping pixel data of the selected pixels of the base image into that virtual pixel.

29. A method of synthesizing an image of a scene corresponding to the image of said scene which would be observed from a virtual viewpoint location and virtual viewing direction, the method comprising the steps of:

(a) providing a plurality of discrete images corresponding to the images of the scene observed from a plurality of discrete view directions from a plurality of discrete viewpoints distributed in two orthogonal dimensions of said scene on a viewpoint locus, each said discrete view defining a view location vector having an azimuth component in an azimuth direction and an elevation component in an elevation direction orthogonal to the azimuth direction, each said discrete image including pixel data for pixels in an array extending in first and second image dimensions orthogonal to one another and to the view location vector, so that:

(i) each pixel in each said discrete image has a ray direction vector extending from such pixel through the viewpoint of the discrete image to a point in the scene depicted by such pixel, each such ray direction vector having azimuth and elevation components in said azimuth and elevation directions, respctively;

(ii) the position of each pixel in the first image direction corresponds to the difference between the azimuth component of the view location vector of the discrete image and the azimuth component of the ray direction vector of said pixel; and (iii) the position of each pixel in the second image direction corresponds to the difference between the elevation component of the view location vector of the discrete image and said ray direction vector of said pixel;

(b) constructing a first epipolar image from said discrete images, said first epipolar image including a plurality of line sets, each said line set including one line of pixel data in said first image dimension from each said discrete image, all of the lines in each said line set corresponding to the same location in said second image dimension, said lines of pixel data within each line set being ordered so that each said line set defines an epipolar space having a first epipolar coordinate corresponding to the azimuth components of the view location vectors, having a second epipolar coordinate corresponding to the elevation components of the view location vector and also corresponding to the elevation components of the ray direction vectors of the pixels, and having a third epipolar coordinate corresponding to the azimuth components of the ray direction vectors of the pixels and;

(c) forming a two-dimensional it array of virtual pixels constituting said synthetic image so that each said virtual pixel in the set has a ray direction vector from the virtual pixel through the virtual viewpoint location, each said ray direction vector from each virtual pixel having azimuth and elevation components in said azimuth and elevation directions, and (d) selecting a plurality of pixel sets in said array of virtual pixels, each such pixel set including one virtual pixel or a plurality of mutually adjacent virtual pixels, each said pixel set defining a principal ray vector extending through the virtual viewpoint and having azimuth and elevation components close to the azimuth and elevation components of the ray direction vectors of the pixels in such pixel set and, for each said pixel set:
  (i) determining an intercept of the principal ray vector on the viewpoint locus;
  (ii) providing a line of one said line set having first and second epipolar coordinates corresponding to the azimuth and elevation components of a view location vector for a view location close to said intercept as a base line for the pixel set;
  (iii) for each virtual pixel in the set, selecting one or more pixels of the base line having a third epipolar coordinate close to the azimuth component of the ray direction vector of that virtual pixel; and
  (iv) mapping pixel data of the selected pixels of the base image into such pixel of the pixel set.

30. A method as claimed in claim 29 wherein each said pixel set includes only one pixel of the virtual viewpoint image, and wherein the principal ray vector of each pixel set is the ray direction vector of the pixel constituting such set.

31. A method as claimed in claim 30 further comprising the step of providing a lookup table setting forth a plurality of virtual viewpoint locations pixel locations in said first and second image dimensions, and location data specifying one or more pixels within a base line for each such virtual viewpoint location and pixel location, said step of selecting said base line and said pixels in Said base line for each pixel set including the steps of and selecting the pixels in accordance with said location data for the virtual viewpoint and pixel location of each pixel.

32. A method as claimed in claim 29 wherein said viewpoint locus is a sphere or a portion of a sphere, said discrete viewpoint directions being substantially radial with respect to said sphere or portion of a sphere.

33. A method as claimed in claim 29 further comprising the step of providing a lookup table setting forth a plurality of viewpoint location and principal view directions and base view location data specifying base views for each such virtual viewpoint location and principal view direction, said step of selecting said base view for each pixel set including the step of selecting the base view from said lookup table in accordance with said base view location data.

34. A method as claimed in claim 29 wherein said base viewpoint for at least some pixel sets is located between a plurality of said discrete viewpoints and wherein, for each such base viewpoint, said step of providing said base line in each said line set includes the Step of deriving pixel data for pixels constituting such base line from pixel data in lines of said line set corresponding to discrete viewpoints in the vicinity of said base viewpoint.

35. A method as claimed in claim 29 wherein said step of providing said base line for each pixel set includes selecting the line in the associated line set corresponding to the discrete viewpoint closest to the intercept of the principal ray line on the viewpoint locus and providing the so-selected line as pixel data of the base line.

36. A method as claimed in any one of claims 1, 8, 19, 28 or 29 wherein said step of providing said discrete images includes the steps of capturing images of a real scene by means of one or more cameras and correcting each said captured image for distortion introduced by the camera.

37. A method as claimed in claim 36 wherein said step of capturing images by means of one or more cameras includes the steps of moving said one or more cameras with respect to the scene and capturing different discrete images at different positions of said one or more cameras.

38. A method of providing telepresence comprising the step of detecting the disposition of a real observer as the observer moves, selecting at least one virtual viewpoint location and direction corresponding to a viewpoint location and view direction of the real observer, synthesizing a virtual viewpoint image by a method as claimed in any one of claims 1, 11, 22, 31 and 33 for each selected virtual viewpoint location and direction and displaying the virtual viewpoint image to the observer substantially in real time, so that the observer sees the correct virtual viewpoint image for a new disposition substantially immediately as he moves to the new disposition.

39. A method as claimed in claim 38 wherein said step of selecting at least one virtual viewpoint location and direction includes the step of selecting a pair of virtual viewpoint locations offset from one another by an interpupillary distance, said steps of synthesizing and displaying being conducted so as to display a binocular pair of images, one to each eye of the observer.

40. A method as claimed in claim 38 wherein said step of selecting at least one virtual viewpoint image includes the step of selecting a plurality of virtual viewpoints simultaneously corresponding to the locations of a plurality of viewers, said synthesizing step including the step of synthesizing a virtual viewpoint image for each said virtual viewpoint and said displaying step including the step of displaying each said virtual viewpoint image to the associated observer so that each observer sees one or more virtual viewpoint images associated with his position substantially in real time as he moves.

41. A method of compressing a set of images of a scene including a plurality of discrete images corresponding to the images of the scene observed from a plurality of discrete viewpoints, each said discrete image including an array of pixel dan arranged in a first image dimension corresponding to position of depicted objects in a first dimension in real space and in a second image dimension orthogonal thereto, the method including the steps of:
  (a) constructing one or more epipolar images from said discrete images, each said epipolar image including a plurality of line sets, each said line set including one line of pixel data in said first image dimension from each said discrete image, all of the lines in each said line set corresponding to the same location in said second image dimension, said lines of pixel data within each line set being ordered in an order corresponding to an order of said viewpoints in said first real dimension; and
  (b) compressing the pixel data in said one or more epipolar images by reducing redundancy in representation of said pixel data to form one or more compressed epipolar images.

42. A method as claimed in claim 41 further comprising the step of transmitting or storing said compressed epipolar images.

43. A method as claimed in claim 42 further comprising the step of decompressing said compressed epipolar images.

44. A method as claimed in claim 41 wherein said step of compressing the pixel data in said line sets includes is performed by compressing the data in each said line set independently of the data in the other said line sets.

45. A method as claimed in claim 41 wherein said set of discrete images of said scene includes a plurality of subsets of discrete images representing the scene at different times, all of the images in each said subset representing the scene at the same time, said step of forming one or more epipolar images includes the step of constructing an epipolar images from the discrete images in each said subset, whereby each said epipolar image corresponds on one said time, said compressing step including the step of comparing data in a first said epipolar image with data in at least one other said epipolar image from a different time to determine the differences therebetween.

46. A method as claimed in claim 45 wherein said comparing step includes the step of comparing each said line set in said first epipolar image with a corresponding line set in one or more other epipolar images.

47. A method of combining a first set of images of a first scene and a second set of images of a second scene, each said set of images including a plurality of discrete images corresponding to the images of the scene observed from a plurality of discrete viewpoints, each said discrete image including an array of pixel data arranged in a first image dimension corresponding to position of depicted objects in a first dimension in real space and in a second image dimension orthogonal thereto, the method including the steps of:

(a) constructing a first epipolar image from said first set of discrete images and a second epipolar image from said second set of discrete images, each said epipolar image including a plurality of line sets, each said line set including one line of pixel data in said first image dimension from each said discrete image, all of the lines in each said line set corresponding to the same location in said second image dimension, said lines of pixel data within each line set being ordered in an order corresponding to an order of said viewpoints in said first real dimension; and (b) combining pixel data of each line set in said first epipolar image with pixel data of one line set in said second epipolar image to form combined line sets constituting a combined epipolar image.

48. A method as claimed in claim 47 wherein said step of combining said pixel data includes the step of combining pixel data of each line set in said first epipolar image with one line set in said second epipolar image.

49. A method as claimed in claim 48 wherein said step of combining said pixel data in said line sets includes the step of deriving new pixel data for each pixel in each combined line set by combining pixel data for the corresponding pixel in the line set of the first epipolar image with pixel data for the corresponding pixel in the line set of the second epipolar image according to a combining formula which varies from pixel to pixel.

50. A method as claimed in claim 49 wherein said combining formula is a function of the pixel data in said second line set.

* * * * *

UNITED STATES PATENT AND TRADEMARK OFFICE
CERTIFICATE OF CORRECTION

PATENT NO. : 5,703,961

DATED : December 30, 1997

INVENTOR(S) : Rogina, et. al.

It is certified that error appears in the above-indentified patent and that said Letters Patent is hereby corrected as shown below:

Column 1, line 45, "observers" should read --observer's--.

Column 2, lines 24, 25 and 26, "Generation Of Intermediate Parallax-images For Holographic Stereograms," should read --"Generation Of Intermediate Parallax-images For Holographic Stereograms,"--.

Column 3, line 11, "users" should read --user's--.

Column 3, line 55, "-to th e" should read --to the--.

Column 3, line 59, "Second" should read --second--.

Column 4, line 26, "transform" should read --transformed--.

Column 5, line 10, "cameras" should read --camera--.

Column 5, line 20, "but may instead" should read --but instead--.

Column 5, line 24, "that-the" should read --that the--.

Column 5, line 37, "invention, also" should read --invention also--.

Column 5, lines 54, 55, "the that line" should read --the line--.

Column 6, line 2, "in-the" should read --in the--.

Column 6, line 6, "adjacent-the" should read --adjacent the--.

Column 7, line 16, "with embodiment" should read --with an embodiment--.

UNITED STATES PATENT AND TRADEMARK OFFICE
CERTIFICATE OF CORRECTION

PATENT NO. : 5,703,961
DATED : December 30, 1997
INVENTOR(S) : Rogina, et. al.

It is certified that error appears in the above-indentified patent and that said Letters Patent is hereby corrected as shown below:

Column 7, line 55, "depicts of the" should read --depicts the--.

Column 8, line 24, "raster-scanning scanning image" should read --raster-scanning image--.

Column 9, line 11, "Compressed" should read --compressed--.

Column 9, line 28, "Unit" should read --unit--.

Column 10, line 20, "if" should read --of--.

Column 12, line 26, "depicted found in the" should read --depicted in the--.

Column 12, line 65, "assigning" should read --reassigning--.

Column 16, line 12, "increase" should read --increases--.

Column 18, line 6, "adjacent lines 184 through 184." should read --adjacent lines 184.--

Column 18, line 31, "A," should read --A*--.

Column 19, line 11, "142" should read --144--. (2nd occurrence).

Column 19, line 54, "Z" should read --Z'--.

Column 20, line 4, "502, the" should read --502. The--.

Figure 23:
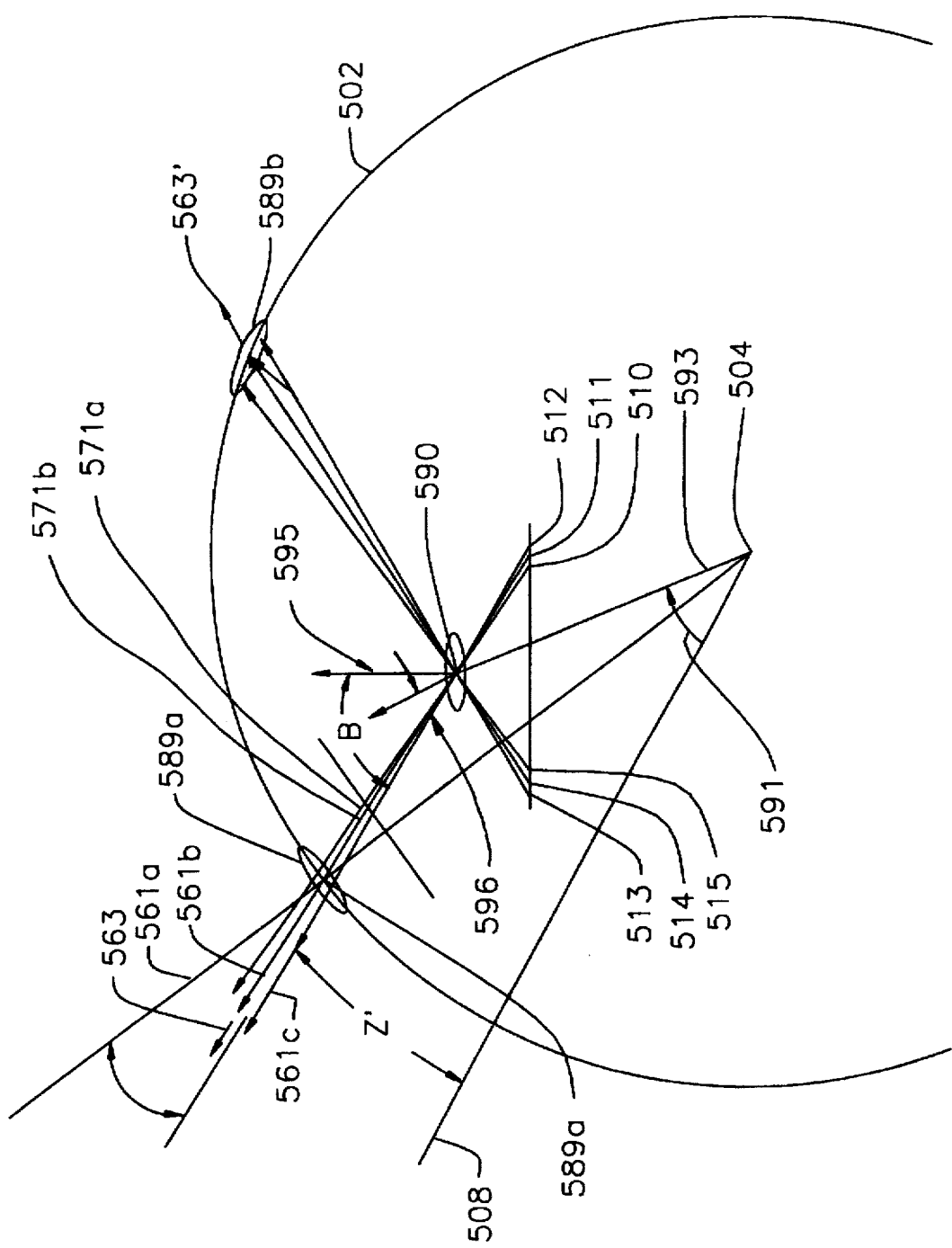
FIG. 23 is a view similar to FIG. 13 but depicting a virtual viewpoint associated with the embodiment of FIG. 22.

Column 20, line 48, "FIG. 22 and 22" should read --FIG. 22 and 23--.

UNITED STATES PATENT AND TRADEMARK OFFICE
CERTIFICATE OF CORRECTION

PATENT NO. : 5,703,961
DATED : December 30, 1997
INVENTOR(S) : Rogina, et. al.

It is certified that error appears in the above-indentified patent and that said Letters Patent is hereby corrected as shown below:

Column 21, line 39, "vertical horizontal" should read --vertical and horizontal--.

Column 21, line 40, "671, the" should read --671 in the --.

Column 22, line 43, "wit-bin" should read --within--.

Column 22, line 57, "in the for surrounding" should read --in the surrounding--.

Column 25, line 23, "and a artificial" should read --and artificial--.

Column 26, line 16, "illustrate" should read --illustrated--.

Column 27, line 7, "position Of the" should read --position of the--.

Column 30, line 50, "claim 19" should read --claim 20--.

Column 31, line 45 "said time dimension" should read --said first dimension--

Column 32, line 61, "two-dimensional it array" should read --two-dimensional array--.

Column 33, line 27, "locations pixel" should read --locations and pixel--.

Column 33, line 31, "in Said base" should read --in said base--.

Column 33, line 51, "the Step of" should read --the step of--.

UNITED STATES PATENT AND TRADEMARK OFFICE
CERTIFICATE OF CORRECTION

PATENT NO. : 5,703,961
DATED : December 30, 1997
INVENTOR(S) : Rogina, et. al.

It is certified that error appears in the above-indentified patent and that said Letters Patent is hereby corrected as shown below:

Column 34, lines 10, 1, 11, 22, 31 and 33" should read --1,8,19,28 and 29--.

Column 34, line 38, "pixel dan" should read --pixel data--.

Column 34, lines 62, 63, "includes is performed by compressing" should read --includes compressing--.

Column 35, line 3, "constructing an epipolar" should read --constructing epipolar--.

Signed and Sealed this

Twenty-fifth Day of August, 1998

Attest:

BRUCE LEHMAN

*Attesting Officer*  *Commissioner of Patents and Trademarks*